US012592847B2

(12) United States Patent
Marzban et al.

(10) Patent No.: US 12,592,847 B2
(45) Date of Patent: Mar. 31, 2026

(54) REFERENCE SIGNALS SAMPLING AND IMPUTATION FOR ENABLING PARAMETER ESTIMATION VIA DEEP LEARNING

(71) Applicant: QUALCOMM Incorporated, San Diego, CA (US)

(72) Inventors: Mohamed Fouad Ahmed Marzban, San Diego, CA (US); Wooseok Nam, San Diego, CA (US); Tao Luo, San Diego, CA (US); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 489 days.

(21) Appl. No.: 18/152,082

(22) Filed: Jan. 9, 2023

(65) Prior Publication Data

US 2024/0235896 A1 Jul. 11, 2024

(51) Int. Cl.
*H04L 25/02* (2006.01)
*H04B 7/06* (2006.01)

(52) U.S. Cl.
CPC ........ *H04L 25/0224* (2013.01); *H04L 25/024* (2013.01); *H04B 7/0626* (2013.01)

(58) Field of Classification Search
CPC .. H04L 25/0224; H04L 25/024; H04B 7/0626
See application file for complete search history.

(56) References Cited

U.S. PATENT DOCUMENTS

2024/0187186 A1* 6/2024 Echigo .................. H04L 5/0048

FOREIGN PATENT DOCUMENTS

WO WO-2022208687 A1 10/2022
WO WO-2022256981 A1 12/2022

OTHER PUBLICATIONS

Interdigital Inc: "Discussion on AI/ML for CSI Feedback Enhancement", 3GPP TSG-RAN WG 1 #IIObis-e, R1-2209641, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 10-Oct. 19, 2022, 7 Pages, Sep. 30, XP052259114, chapter 2.2, p. 4-p. 5.
Panasonic: "Discussion on AI/ML for CSI Feedback Enhancement", 3GPP TSG RAN WG1 #109e, R1-2204659, 3rd Generation Partnership Project (3GPP), Mobile Competence Centre, 650, Route Des Lucioles, F-06921 Sophia-Antipolis Cedex, France, vol. RAN WG1, No. e-Meeting, May 9-May 20, 2022, 5 Pages, Apr. 29, 2022, XP052153625, p. 4-p. 5, the whole document.

(Continued)

*Primary Examiner* — Natasha W Cosme
(74) *Attorney, Agent, or Firm* — Holland & Hart LLP/Qualcomm

(57) ABSTRACT

Disclosed is a method for wireless communication. The method comprises receiving, from a network node, a reference signal (RS) of a first type. An input signal of a second type is determined based on the reference signal. Signals of the second type are associated with training a first machine learning (ML) model applied by a UE to estimate a parameter used in wireless communications by the UE. The input signal of the second type is applied to the first ML model to estimate the parameter used in wireless communications by the UE.

22 Claims, 11 Drawing Sheets

400 ⟶

(56) References Cited

OTHER PUBLICATIONS

Partial International Search Report—PCT/US2023/081159—ISA/EPO—Mar. 11, 2024 (2201183WO).
International Search Report and Written Opinion—PCT/US2023/081159—ISA/EPO—Nov. 7, 2024 (2201183WO).
LG Electronics Inc., "Aspect of ML Model Provisioning Between UE and Network", 3GPP TSG-RAN2 #119bis, R2-2210564, Oct. 2022, 3rd Generation Partnership Project, Mobile Competence Centre, 650, Route Des Lucioles, F-06921 Sophia-Antipolis Cedex, France, vol. RAN WG2, No. Electronic Meeting, Sep. 30, 2022, XP052263876, 6 Pages, Section 2.3.

* cited by examiner

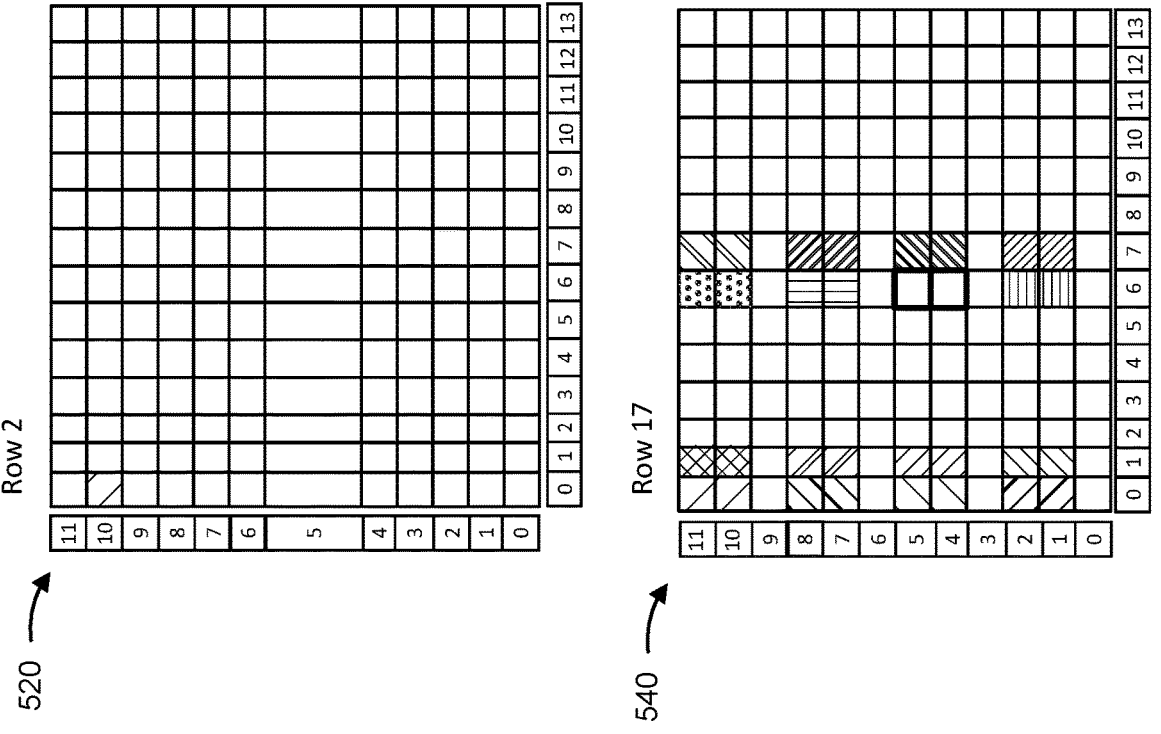
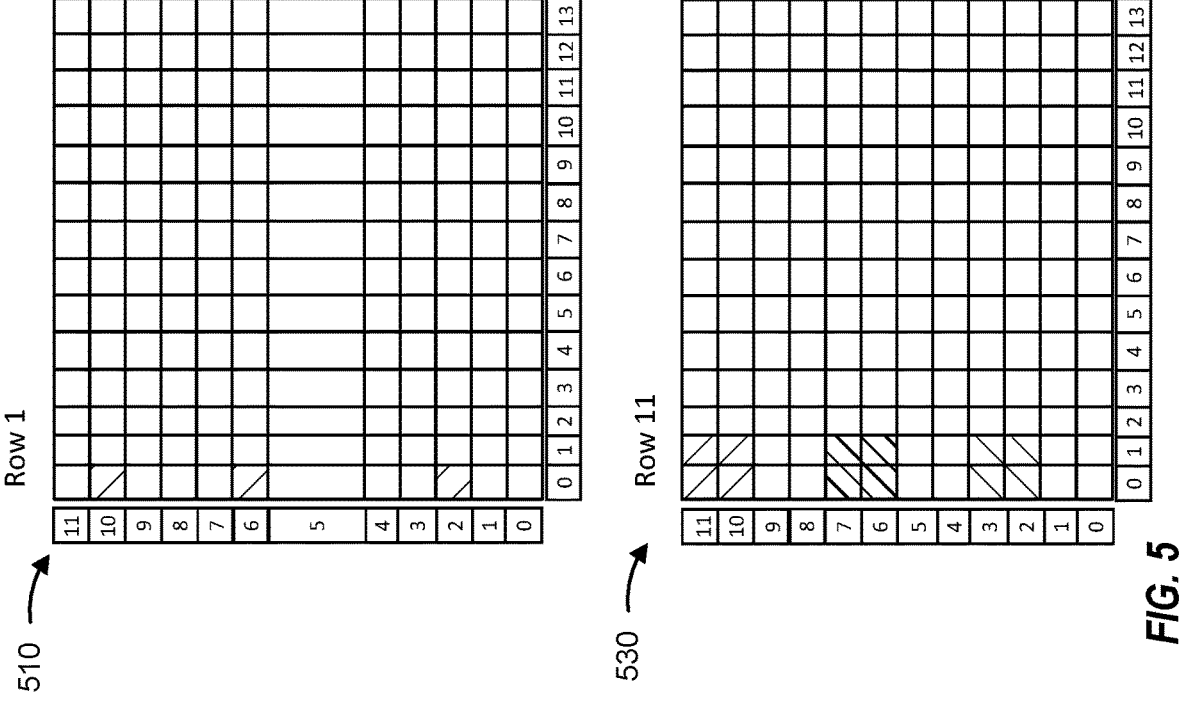
*FIG. 5*

800

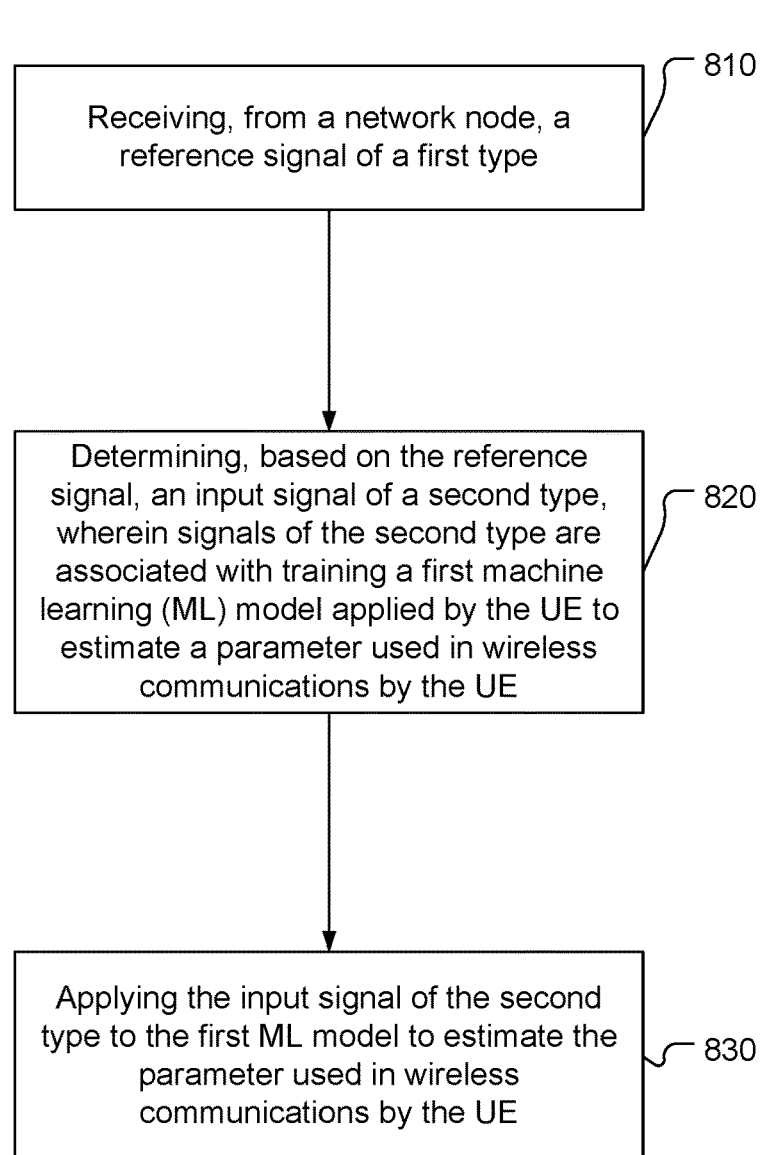

810

Receiving, from a network node, a reference signal of a first type

820

Determining, based on the reference signal, an input signal of a second type, wherein signals of the second type are associated with training a first machine learning (ML) model applied by the UE to estimate a parameter used in wireless communications by the UE

830

Applying the input signal of the second type to the first ML model to estimate the parameter used in wireless communications by the UE

*FIG. 8*

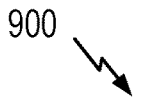

900

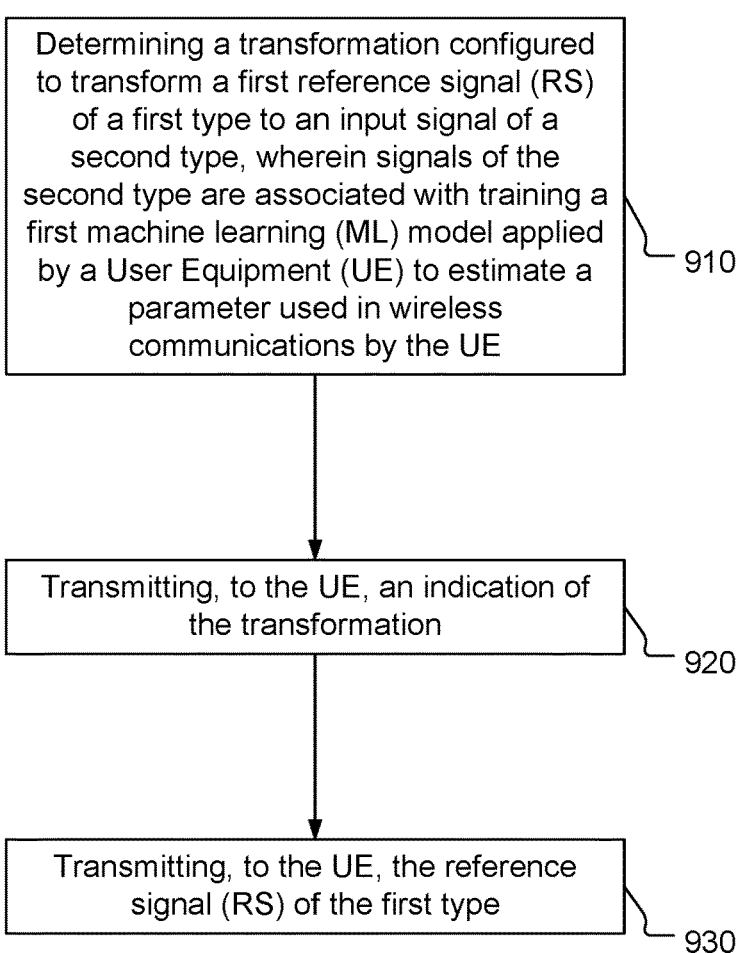

Determining a transformation configured to transform a first reference signal (RS) of a first type to an input signal of a second type, wherein signals of the second type are associated with training a first machine learning (ML) model applied by a User Equipment (UE) to estimate a parameter used in wireless communications by the UE

910

Transmitting, to the UE, an indication of the transformation

920

Transmitting, to the UE, the reference signal (RS) of the first type

Receiving, from a user equipment (UE), UE capability information indicating an input signal of a first type, wherein signals of the first type are associated with training a machine learning (ML) model applied by the UE to estimate a parameter used in wireless communications by the UE — 1010

Transmitting, to the UE, a reference signal of the first type — 1020

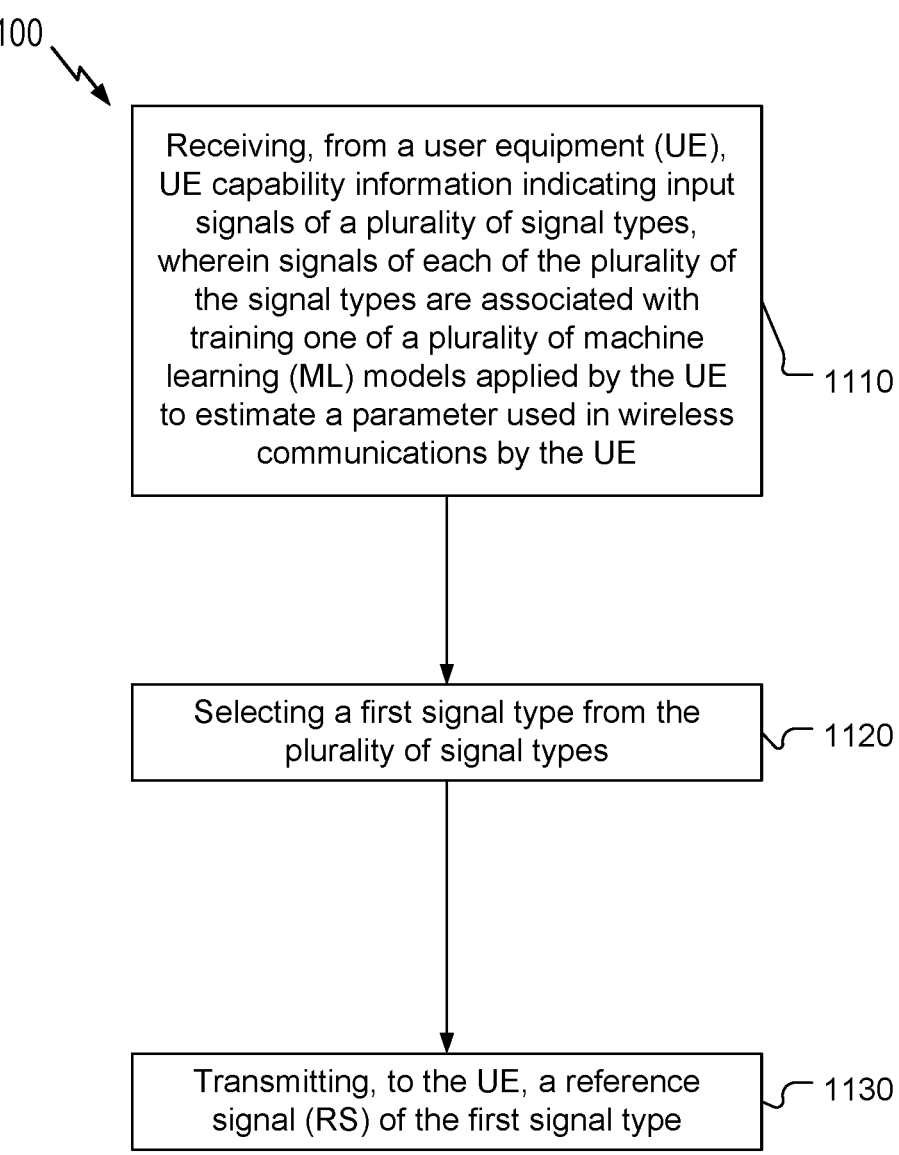

1100

Receiving, from a user equipment (UE), UE capability information indicating input signals of a plurality of signal types, wherein signals of each of the plurality of the signal types are associated with training one of a plurality of machine learning (ML) models applied by the UE to estimate a parameter used in wireless communications by the UE — 1110

Selecting a first signal type from the plurality of signal types — 1120

Transmitting, to the UE, a reference signal (RS) of the first signal type — 1130

*FIG. 11*

REFERENCE SIGNALS SAMPLING AND IMPUTATION FOR ENABLING PARAMETER ESTIMATION VIA DEEP LEARNING

INTRODUCTION

Aspects of the present disclosure generally relate to wireless communications, and more particularly to techniques, systems and apparatuses for sampling and imputing reference signals for enabling communication parameter estimation via deep learning.

Within the present disclosure, "parameter estimation" refers to the estimation of communication parameters which are currently relevant for wireless communication or to the estimation of communication parameters which may be relevant for wireless communication in the future (e.g., parameter prediction). I.e., within the present disclosure, "estimating a parameter" may include "predicting a parameter".

Wireless communication systems have developed through various generations, including a first-generation analog wireless phone service (1G), a second-generation (2G) digital wireless phone service (including interim 2.5G networks), a third-generation (3G) high speed data, Internet-capable wireless service, a fourth-generation (4G) service (e.g., Long-Term Evolution (LTE), WiMax, etc.), and most recently a fifth-generation (5G) service. There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile communication (GSM), etc.

The 5G mobile telecommunication standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users with, for example, a gigabit connection speeds to tens of users in a common location, such as on an office floor. Several hundreds of thousands of simultaneous connections are to be supported in order to support large sensor deployments. Consequently, there is a need for significantly enhancing the spectral efficiency of 5G mobile communications compared to the current 4G/LTE standard. Furthermore, there is also a corresponding need for enhancing signaling efficiencies and substantially reducing latency compared to current standards.

Machine Learning (ML), and more specifically deep learning models, typically have high complexity since they require intensive matrix multiplications and pooling operations. A network node, such as a user equipment (UE) may use an ML model (e.g., a neural network, a multi-layer perceptron, convolutional neural network, etc.) to estimate various parameters associated with wireless communication by the UE (e.g., an interference level, channel state information (CSI), beam forming parameters etc.) One of the main challenges with using ML models for parameter estimation in wireless communications is that such ML models typically require input data arranged as a vectors of fixed dimension. As a result, changing the dimension of the input data, typically requires re-training of the ML model, which is associated with high complexity and high use of computational resources.

A network node such as a UE typically receives and measures reference signals (RSs), such as CSI reference signals (CSI-RSs), Sounding Reference Signals (SRSs), Demodulation Reference Signals (DMRSs), Phase Tracking reference Signals (PTRSs), Beam Measurement Reference Signals (BRS), Beam Refinement Reference Signals (BRRS) or other RSs which may be utilized as input parameters to a (trained) ML model for estimating a beam parameter, such as beam selection, interference estimation/prediction, phase noise estimation, localization, estimation of CSI such as a Channel Quality Indicator (CQI), Precoding Matrix Indicator (PMI), Rank Indicator (RI), etc. Further beam parameters like physical channel, azimuth peak, elevation peak, azimuth width, elevation width, peak power, or the like may also be estimated/predicted by the use of an ML model. However, the dimensions of the received RS (e.g., the number of OFDM resource elements carrying the RS) may change according to a configuration of the network node. Thus, conventionally, to be able to use ML for parameter estimation and/or prediction, multiple ML models of different dimensions need to be trained, stored and utilized for multiple reference signals having different dimensions. This requires high complexity because a separate ML model needs to be trained for every possible configuration of a RS. Further, UEs may be unable to adapt to new RS configurations without training a new ML model for every change in RS configuration.

RSs may have different configurations in time and may be changed dynamically or semi-statically by the network, e.g., via signaling from a BS to a UE. Thus, it is desirable to develop methods, systems and apparatuses that facilitate utilizing ML for communication parameter estimation which and thereby allow for the adaptation of different RS configurations in few or in only one ML model.

SUMMARY

The following presents a simplified summary relating to one or more aspects disclosed herein. A more detailed disclosure follows in the next section with reference to the appended drawings.

In some aspects of the present disclosure a method for wireless communication by a user equipment (UE) is provided. The method may comprise receiving, from a network node, a reference signal (RS) of a first type; determining, based on the reference signal, an input signal of a second type, wherein signals of the second type are associated with training a first machine learning (ML) model applied by the UE to estimate a parameter used in wireless communications by the UE; and applying the input signal of the second type to the first ML model to estimate the parameter used in wireless communications by the UE.

In some aspect of the present disclosure, an apparatus for wireless communication by a user equipment (UE) is provided. The apparatus may comprise a memory and one or more processors coupled to the memory, the memory and the one or more processors configured to receive, from a network node, a reference signal (RS) of a first type; determine, based on the reference signal, an input signal of a second type, wherein signals of the second type are associated with training a first machine learning (ML) model applied by the UE to estimate a parameter used in wireless communications by the UE; and apply the input signal of the second type to the first ML model to estimate the parameter used in wireless communications by the UE.

In some aspect of the present disclosure, an apparatus for wireless communication by a user equipment (UE) is provided. The method may comprise means for receiving, from a network node, a reference signal (RS) of a first type; means for determining, based on the reference signal, an input signal of a second type, wherein signals of the second type are associated with training a first machine learning (ML) model applied by the UE to estimate a parameter used in wireless communications by the UE; and means for applying the input signal of the second type to the first ML model to estimate the parameter used in wireless communications by the UE.

In some aspects of the present disclosure, a non-transitory computer-readable medium may store one or more instructions (e.g., a computer program) for wireless communication. The one or more instructions, when executed by one or more processors may cause the one or more processors to receive, from a network node, a reference signal (RS) of a first type; determine, based on the reference signal, an input signal of a second type, wherein signals of the second type are associated with training a first machine learning (ML) model applied by the UE to estimate a parameter used in wireless communications by the UE; and apply the input signal of the second type to the first ML model to estimate the parameter used in wireless communications by the UE.

In some aspects of the present disclosure a method for wireless communication by a network node is provided. The method may comprise determining a transformation configured to transform a first reference signal (RS) of a first type to an input signal of a second type, wherein signals of the second type are associated with training a first machine learning (ML) model applied by a User Equipment (UE) to estimate a parameter used in wireless communications by the UE; transmitting, to the UE, an indication of the transformation; and transmitting, to the UE, the first reference signal (RS) of the first type.

In some aspect of the present disclosure, an apparatus for wireless communication by a network node is provided. The apparatus may comprise a memory and one or more processors coupled to the memory, the memory and the one or more processors configured to determine a transformation configured to transform a first reference signal (RS) of a first type to an input signal of a second type, wherein signals of the second type are associated with training a first machine learning (ML) model applied by a User Equipment (UE) to estimate a parameter used in wireless communications by the UE; transmit, to the UE, an indication of the transformation; and transmit, to the UE, the first reference signal (RS) of the first type.

In some aspect of the present disclosure, an apparatus for wireless communication by a network node is provided. The apparatus may comprise means for determining a transformation configured to transform a first reference signal (RS) of a first type to an input signal of a second type, wherein signals of the second type are associated with training a first machine learning (ML) model applied by a User Equipment (UE) to estimate a parameter used in wireless communications by the UE; means for transmitting, to the UE, an indication of the transformation; and means for transmitting, to the UE, the first reference signal (RS) of the first type.

In some aspects of the present disclosure, a non-transitory computer-readable medium may store one or more instructions (e.g., a computer program) for wireless communication. The one or more instructions, when executed by one or more processors may cause the one or more processors to determine a transformation configured to transform a first reference signal (RS) of a first type to an input signal of a second type, wherein signals of the second type are associated with training a first machine learning (ML) model applied by a User Equipment (UE) to estimate a parameter used in wireless communications by the UE; transmit, to the UE, an indication of the transformation; and transmit, to the UE, the first reference signal (RS) of the first type.

In some aspects of the present disclosure a method for wireless communication by a network node is provided. The method may comprise receiving, from a user equipment (UE), UE capability information indicating an input signal of a first type, wherein signals of the first type are associated with training a machine learning (ML) model applied by the UE to estimate a parameter used in wireless communications by the UE; and transmitting, to the UE, a reference signal of the first type.

In some aspect of the present disclosure, an apparatus for wireless communication by a network node is provided. The apparatus may comprise a memory and one or more processors coupled to the memory, the memory and the one or more processors configured to receive, from a user equipment (UE), UE capability information indicating an input signal of a first type, wherein signals of the first type are associated with training a machine learning (ML) model applied by the UE to estimate a parameter used in wireless communications by the UE; and transmit, to the UE, a reference signal of the first type.

In some aspect of the present disclosure, an apparatus for wireless communication by a network node is provided. The apparatus may comprise means for receiving, from a user equipment (UE), UE capability information indicating an input signal of a first type, wherein signals of the first type are associated with training a machine learning (ML) model applied by the UE to estimate a parameter used in wireless communications by the UE; and means for transmitting, to the UE, a reference signal of the first type.

In some aspects of the present disclosure, a non-transitory computer-readable medium may store one or more instructions (e.g., a computer program) for wireless communication. The one or more instructions, when executed by one or more processors may cause the one or more processors to receive, from a user equipment (UE), UE capability information indicating an input signal of a first type, wherein signals of the first type are associated with training a machine learning (ML) model applied by the UE to estimate a parameter used in wireless communications by the UE; and transmit, to the UE, a reference signal of the first type.

In some aspects of the present disclosure a method for wireless communication by a network node is provided. The method may comprise receiving, from a user equipment (UE), UE capability information indicating input signals of a plurality of signal types, wherein signals of each of the plurality of the signal types are associated with training one of a plurality of machine learning (ML) models applied by the UE to estimate a parameter used in wireless communications by the UE; selecting a first signal type from the plurality of signal types; and transmitting, to the UE, a reference signal (RS) of the first signal type.

In some aspect of the present disclosure, an apparatus for wireless communication by a network node is provided. The apparatus may comprise a memory and one or more processors coupled to the memory, the memory and the one or more processors configured to receive, from a user equipment (UE), UE capability information indicating input signals of a plurality of signal types, wherein signals of each of the plurality of the signal types are associated with training one of a plurality of machine learning (ML) models applied by the UE to estimate a parameter used in wireless communications by the UE; select a first signal type from the plurality of signal types; and transmit, to the UE, a reference signal (RS) of the first signal type.

In some aspect of the present disclosure, an apparatus for wireless communication by a network node is provided. The apparatus may comprise means for receiving, from a user equipment (UE), UE capability information indicating input signals of a plurality of signal types, wherein signals of each of the plurality of the signal types are associated with training one of a plurality of machine learning (ML) models applied by the UE to estimate a parameter used in wireless communications by the UE; means for selecting a first signal type from the plurality of signal types; and means for transmitting, to the UE, a reference signal (RS) of the first signal type.

In some aspects of the present disclosure, a non-transitory computer-readable medium may store one or more instructions (e.g., a computer program) for wireless communication. The one or more instructions, when executed by one or more processors may cause the one or more processors to receive, from a user equipment (UE), UE capability information indicating input signals of a plurality of signal types, wherein signals of each of the plurality of the signal types are associated with training one of a plurality of machine learning (ML) models applied by the UE to estimate a parameter used in wireless communications by the UE; select a first signal type from the plurality of signal types; and transmit, to the UE, a reference signal (RS) of the first signal type.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, follows by reference to aspects, some of which are illustrated in the appended drawings. It is to be noted, however, that the appended drawings illustrate only some typical aspects of this disclosure and are therefore not to be considered limiting of its scope. The same reference numbers in different drawings may identify the same or similar elements.

FIG. 5 is a diagram illustrating different examples for configurations of CSI-RSs, in accordance with some aspects of the present disclosure.

FIG. 8 is a flow chart illustrating an example of a process of wireless communication by a UE, in accordance with some aspects of the present disclosure.

FIG. 9 is a flow chart illustrating an example of a process of wireless communication by a network node, e.g., a BS, in accordance with some aspects of the present disclosure.

FIG. 11 is a flow chart illustrating an example of a process of wireless communication by a network node, e.g., a BS, in accordance with some aspects of the present disclosure.

DETAILED DESCRIPTION

Various aspects of the present disclosure are described in more detail hereinafter with reference to the accompanying drawings.

The present disclosure may, however, be implemented in many different forms and should not be construed as limited to any specific structure or function presented in the following. Rather, the following aspects are described so that this disclosure will be thorough and complete, and will fully convey the scope of the present disclosure to those skilled in the art. Based on the teachings herein one skilled in the art should appreciate that the scope of the present disclosure is intended to cover any aspect of the present disclosure disclosed herein, whether implemented independently of or combined with any other aspect of the present disclosure. For example, an apparatus may be implemented, or a method may be practiced using any number of the aspects set forth herein. In addition, the scope of the present disclosure is intended to cover such an apparatus or method which is practiced using other structure, functionality, or structure and functionality in addition to or other than the various aspects of the present disclosure set forth herein. It should be understood that any aspect of the present disclosure disclosed herein may be implemented by one or more elements of a claim. While specific feature combinations are described in the following with respect to certain aspects of the present disclosure, it is to be understood that not all features of the discussed examples must be present for realizing the technical advantages of the devices, systems, methods and computer programs disclosed herein. Disclosed aspects may be modified by combining certain features of one aspect with one or more features of other aspects. A skilled person will understand that features, steps, components and/or functional elements of one aspect can be combined with compatible features, steps, components and/ or functional elements of any other aspect of the present disclosure.

Several aspects of communication systems will now be presented with reference to various apparatuses, systems and techniques. These apparatuses, systems and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies and Open RAN (O-RAN) technologies.

Figure 1:
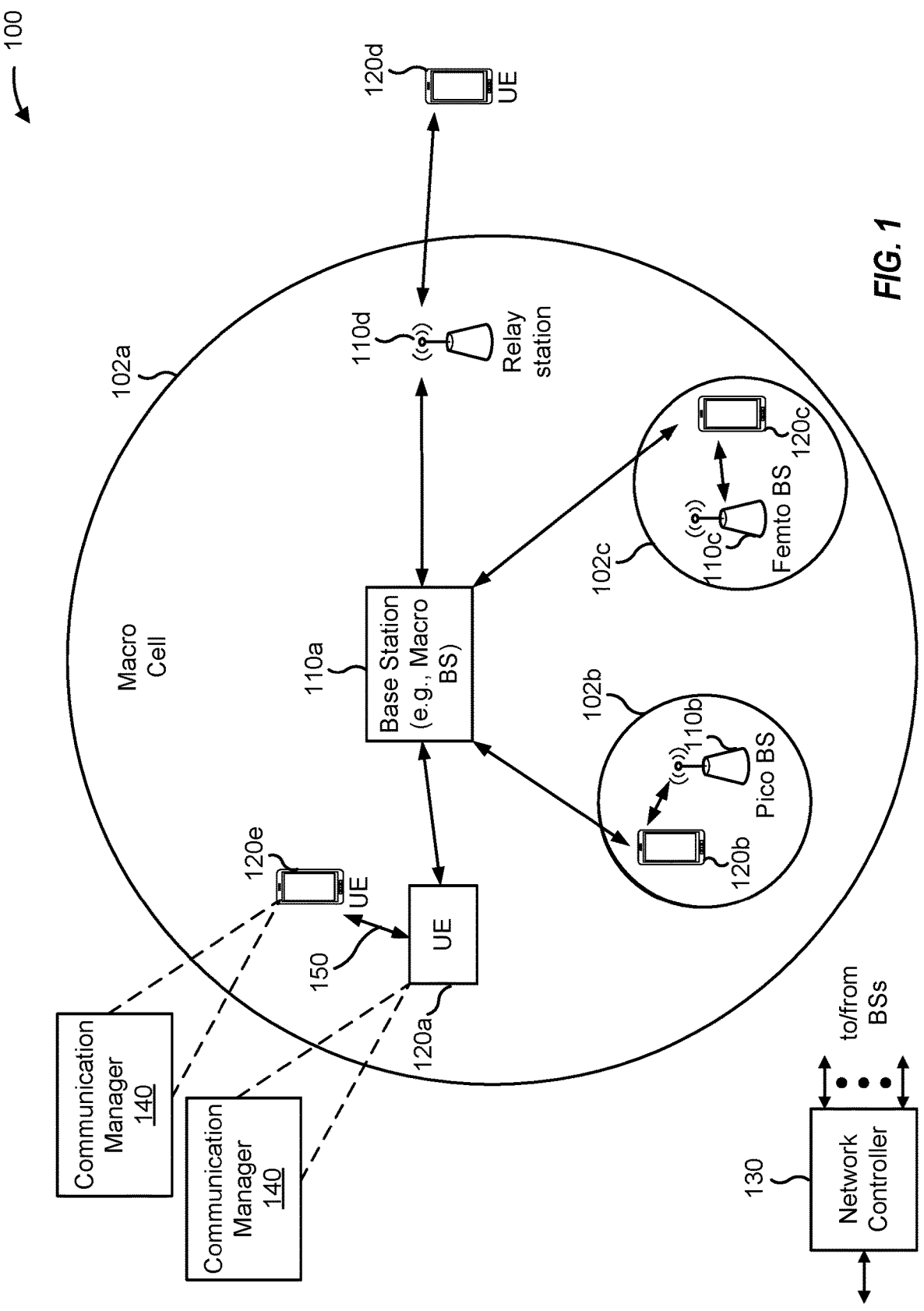
FIG. 1 is a diagram illustrating an example wireless communications system, in accordance with some aspects of the present disclosure.

FIG. 1 is a diagram illustrating a wireless network 100 in which aspects of the present disclosure may be practiced. The wireless network 100 may be an LTE network, an O-RAN network, a 5G or NR network, and/or the like. Wireless network 100 may include a number of network nodes, for example BS s 110 (shown as BS 110a, BS 110b, BS 110c, and BS 110d), and UEs 120 (shown as UE 120a, UE 120b, UE 120c, UE 120d, and UE 120e) and other network entities. A network node that communicates with UEs on a downlink and/or an uplink may also be referred to as a base station, a BS, NR BS, a Node B, a gNB, a 5G node B (gNB), an access point (AP), a transmit receive point (TRP), and/or the like. Each network node may provide communication coverage for a particular geographic area. In 3GPP, the term "cell" can refer to a coverage area of a BS and/or a BS subsystem serving this coverage area, depending on the context in which the term is used. A network node that communicates with a UE via sidelink (SL) may also be referred to as a UE.

A network node, e.g., a BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A network node for a macro cell may be referred to as a macro BS. A network node for a pico cell may be referred to as a pico BS. A network node for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells.

Wireless network 100 may also include relay stations. A relay station is an entity/node that can receive a transmission of data from an upstream node (e.g., a BS or a UE) and send a transmission of the data to a downstream node (e.g., a UE or a BS). A relay station may also be a UE that can relay transmissions for other UEs. In the example shown in FIG. 1, a relay station BS 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BS of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to one or more (e.g., a set of) BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c, 120d, 120e, and/or the like) may be dispersed throughout wireless network 100, and each UE may be stationary or mobile. A UE may communicate with one or more BSs in wireless network 100, may communicate with another UE (e.g., UE 120a and UE 120e, as illustrated in FIG. 1) via SL transmissions (e.g., link 150 shown in FIG. 1 as connecting UE 120a and UE 120e), and/or the like.

In some cases, two or more nodes (e.g., UEs) may communicate with each other using SL transmissions. Applications of such SL communications may include public safety, proximity services, UE-to-network relaying, vehicle-to-everything (V2X) communications, Internet of Everything (IoE) communications, Internet-of-Things (IoT) communications, mission-critical mesh, and/or various other suitable applications. Generally, a SL transmission may refer to a transmission sent from one node (e.g., UE1) to another node (e.g., UE2) without relaying that transmission through a scheduling entity (e.g., UE or BS), even though such a scheduling entity may be involved for scheduling and/or control purposes. In some examples, the SL transmissions may be communicated using a licensed spectrum (unlike wireless local area networks, which may use an unlicensed spectrum).

A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered as machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node (e.g., UE, BS, or the like) may provide, for example, connectivity for or to a network (e.g., a wide area network such as Internet or a cellular network) via a wired or wireless communication link. Some UEs may be considered as Internet-of-Things (IoT) devices, and/or may be implemented as NB-IoT (narrowband internet of things) devices. Some UEs may be considered as a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote unit (RU), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad, open-ended way. The example above where a UE is configured to receive information from a base station also discloses that a first network node is configured to receive information from a second network node, where the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like As described herein, communication of information (e.g., any information, signal, or the like) may be described in various aspects using different terminology. Disclosure of one communication term includes disclosure of other communication terms. For example, a first wireless node may be described as being configured to transmit information to a second wireless node. In this example and consistent with this disclosure, when the first wireless node is configured to transmit information to the second wireless node, the first wireless node may be configured to provide, send, output, communicate, or transmit information to the second wireless node. Similarly, in this example and consistent with this disclosure, when the first wireless node is configured to transmit information to the second wireless node, the second wireless node may be configured to receive, obtain, or decode the information that is provided, sent, output, communicated, or transmitted by the first wireless node.

As shown in FIG. 1, the UE 120 may include a communication manager 140, e.g., implemented in hardware, or software, or a combination thereof. As described in more detail elsewhere herein, the UE 120 may receive a RS of a first type from a network node. Based on the received RS, the UE 120 may determine, for example by means of the communication manager 140, an input signal of a second type, wherein signals of the second type are associated with training a first ML model applied by the UE to estimate a parameter used in wireless communications by the UE 120. The UE 120 may apply the input signal of the second type to the first ML model to estimate the parameter used in wireless communications by the UE 120. For example, the received RS may comprise a first quantity of resource elements (REs) and the input signal may comprise a second quantity of REs, the second quantity of REs being different from the first quantity of REs. UE 120 may, for example by means of communications manager 140, receive, from the network node, an indication for determining the input signal of the second type. The UE 120 may determine the input signal based on the indication. The UE may determine the input signal for example by linear interpolation, Fast Fourier Transform (FFT) interpolation, statistical imputation or other. Further details such as specific methods for determining the input signal are described elsewhere herein.

As indicated above, FIG. 1 is provided merely as an example. Other examples may differ from what is described with regard to FIG. 1.

Figure 2:
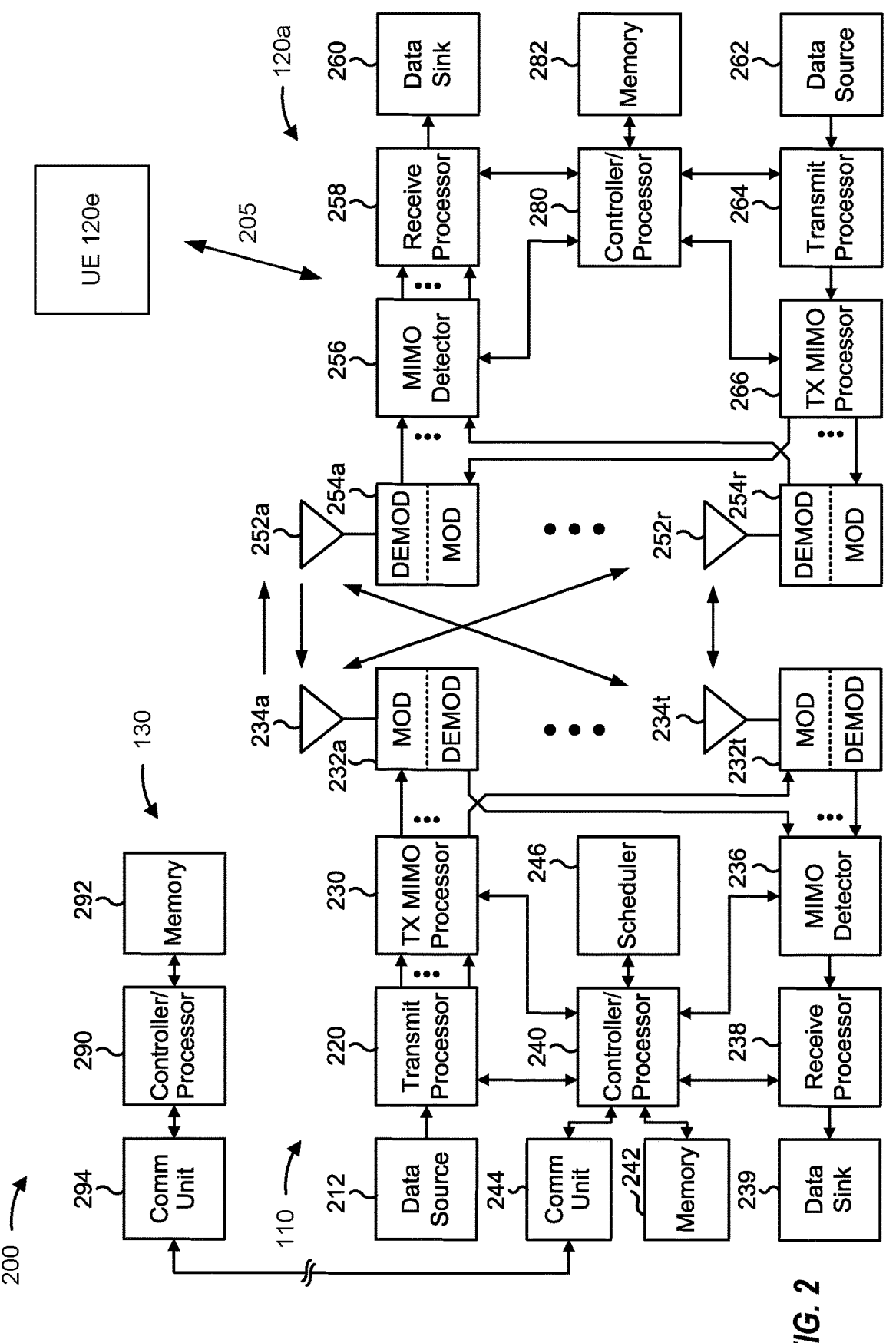
FIG. 2 is a diagram illustrating a design of a BS and a UE device that enable transmission and processing of signals exchanged between the UE and the BS, in accordance with some aspects of the present disclosure.

FIG. 2 shows a block diagram of a node 200 such as a BS 110, and such as UEs 120 120*a* and UE 120*e*, which may be one of the network nodes and one of the UEs in FIG. 1. UE 120*e* may be equipped analogously to UE 120*a*. BS 110 may be equipped with T antennas 234*a* through 234*t*, and UE 120*a* and UE 120*e* may be equipped with R antennas 252*a* through 252*r*, where in general T≥1 and R≥1.

At BS 110, a transmit processor 220 may receive data from a data source 212 for one or more UEs, select one or more modulation and coding schemes (MCS) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (Tx) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators/demodulators (MODs/DEMODs) 232a through 232t. Each modulator/demodulator 232 (e.g., 232a through 232t) may modulate a respective output symbol stream (e.g., for OFDM and/or the like) to obtain an output sample stream. Each modulator/demodulator 232 may further modulate (e.g., convert to analog, amplify, filter, and upconvert) the output sample stream to obtain a downlink signal. T downlink signals from modulators/demodulators 232a through 232t may be transmitted via T antennas 234a through 234t, respectively.

At UE 120a, antennas 252a through 252r may receive the downlink signals from base station 110 and/or other base stations, may receive sidelink signals from another UE 120e (e.g., UE 120a may receive SL signals from UE 120e and/or vice-versa) and may provide received signals to modulators/demodulators (MODs/DEMODs) 254a through 254r, respectively. Each modulator/demodulator 254 (e.g., 254a through 254r) may condition (e.g., filter, amplify, downconvert, and digitize) a received signal to obtain input samples. Each modulator/demodulator 254 may further demodulate the input samples (e.g., for OFDM and/or the like) to obtain received symbols. A MIMO detector 256 may obtain received symbols from all R modulators/demodulators 254a through 254r, perform MIMO detection on the received symbols if applicable, and provide detected symbols. A receive processor 258 may process (e.g., demodulate and decode) the detected symbols, provide decoded data for UE 120a to a data sink 260, and provide decoded control information and system information to a controller/processor 280. A channel processor may identify reference signal received power (RSRP), received signal strength indicator (RSSI), reference signal received quality (RSRQ), channel quality indicator (CQI), and/or the like. In some aspects, one or more components of UE 120a and/or UE 120e may be included in a housing.

On the uplink or on a SL 205, at UE 120a, or at UE 120e, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a Tx MIMO processor 266 if applicable, modulated by modulators/demodulators 254a through 254r (e.g., for DFT-s-OFDM, CP-OFDM, and/or the like), and transmitted to base station 110 on the uplink and/or to another UE 120e on the sidelink. At base station 110, the uplink signals from UE 120a, UE 120e, and other UEs may be received by antennas 234 (e.g., 234a through 234t), demodulated by modulators/demodulators 232, detected by a MIMO detector 236 if applicable, and further processed by a receive processor 238 to obtain decoded data and control information sent by UE 120a and/or UE 120e. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

Controller/processor 240 of BS 110, controller/processor 280 of UE 120a, and/or any other component(s) of FIG. 2 may perform one or more techniques associated with determining an input signal of a second type based on a reference signal of a first type, as described in more detail elsewhere herein. For example, controller/processor 280 of UE 120a, and/or any other component(s) of FIG. 2 may perform or direct operations of, for example, methods disclosed herein, e.g., with reference to FIG. 8, FIG. 9, FIG. 10 or FIG. 11, and/or other methods and processes as described herein. Memories 242 and 282 may store data and program codes for BS 110 and UE 120a, respectively, such as a computer program for determining an input signal of a second type based on a reference signal of a first type as described elsewhere herein.

In some aspects, a UE 120 (e.g., UE 120a and/or UE 120e) may thus include means for receiving, from a network node, a RS of a first type. UE 120 (e.g., UE 120a and/or UE 120e) may further include means for determining, based on the RS, an input signal of a second type, wherein signals of the second type are associated with training a first ML model applied by the UE to estimate a parameter used in wireless communications by the UE. UE 120 (e.g., UE 120a and/or UE 120e) may further include means for applying the input signal of the second type to the first ML model to estimate the parameter used in wireless communications by the UE.

Similarly, in some aspects, a UE 120 (e.g., UE 120a and/or UE 120e) may thus include a memory and one or more processors coupled to the memory, the memory and the one or more processors may be configured to receive, from a network node, a reference signal (RS) of a first type. The one or more processors, and the memory of UE 120 (e.g., UE 120a and/or UE 120e) may be further configured to determine, based on the reference signal, an input signal of a second type, wherein signals of the second type are associated with training a first machine learning (ML) model applied by the UE to estimate a parameter used in wireless communications by the UE. The one or more processors, and the memory of UE 120 (e.g., UE 120a and/or UE 120e) may be further configured to apply the input signal of the second type to the first ML model to estimate the parameter used in wireless communications by the UE.

As indicated above, FIG. 2 is provided merely as an example. Other examples may differ from what is described with regard to FIG. 2.

Figure 3:
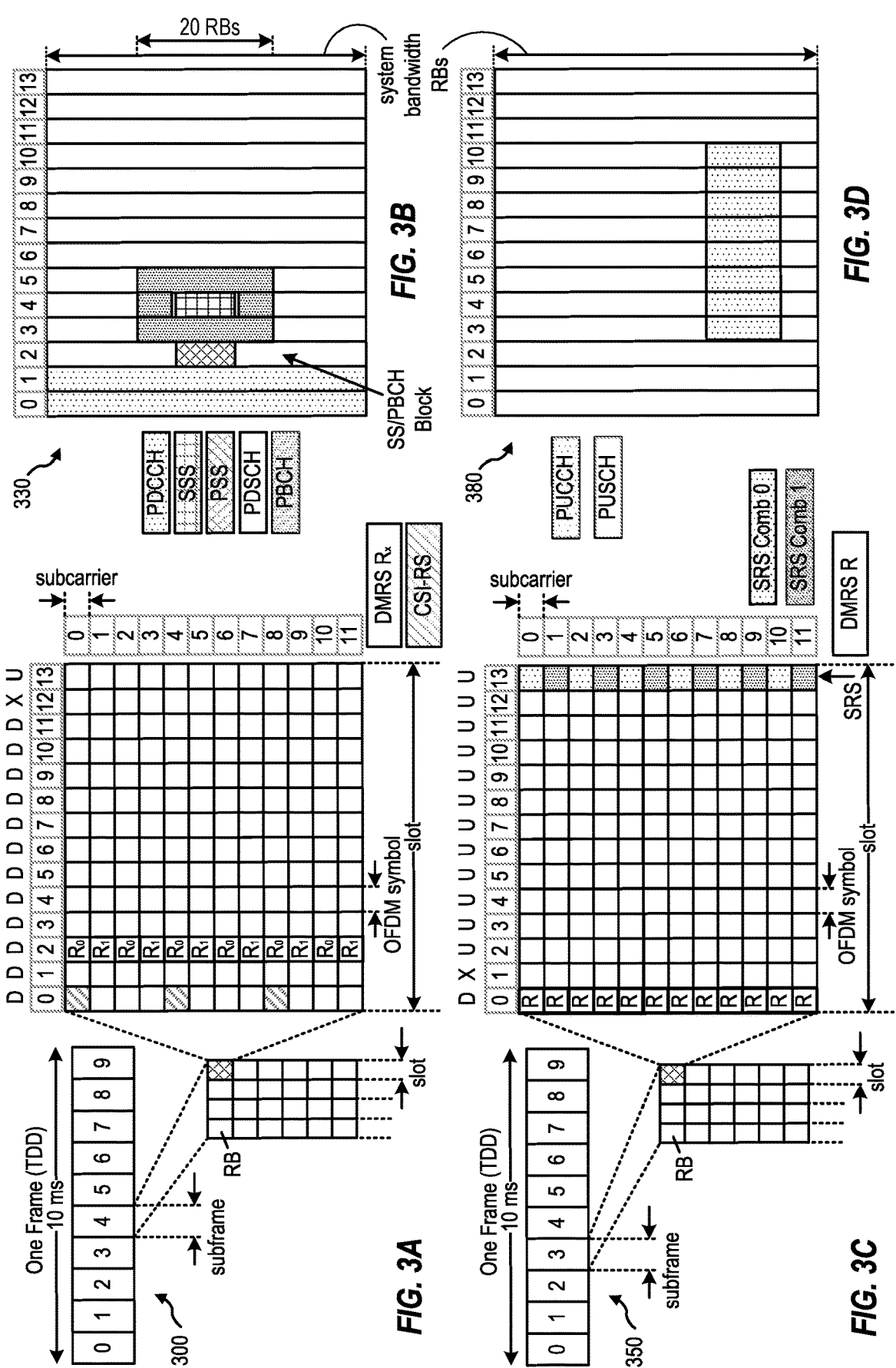
FIGS. 3A to 3D depict various example aspects of data structures for a wireless communication network.

FIGS. 3A to 3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe may be based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$ there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A, 3B, 3C, and 3D provide an example of slot configuration 0 with 14 symbols per slot and numerology 1.1=2 with 4 slots per subframe. The slot duration is 0.25 ms, the subcarrier spacing is 60 kHz, and the symbol duration is approximately 16.67 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 4:
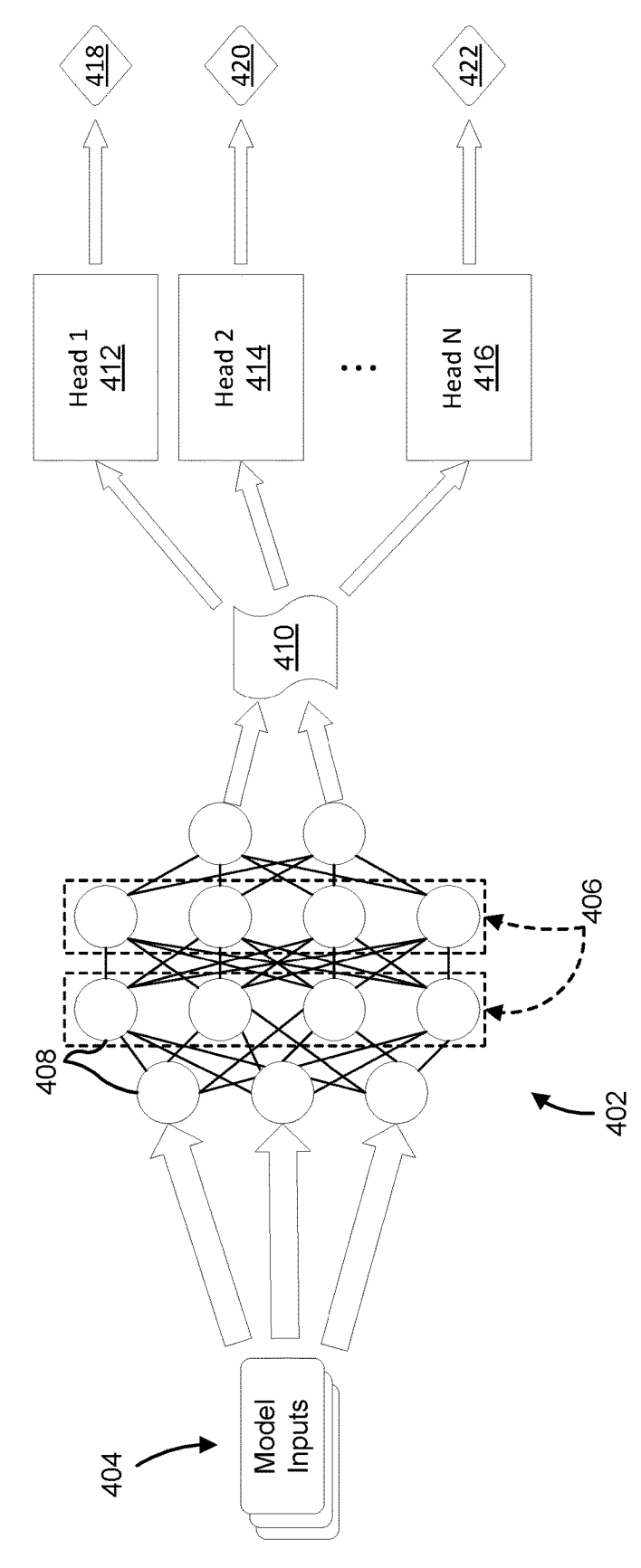
FIG. 4 illustrates an example ML model adapted to estimate communication parameters such as beam forming parameters, in accordance with some aspects of the present disclosure.

FIG. 4 is a diagram illustrating an example 400 of a ML model, in accordance with the present disclosure. In some aspects, the ML model may be a multi-head ML model. In some aspects, for example, the ML model may be implemented on a UE. The ML model may be implemented, for example, by a communication manager. For example, the ML model may include one or more software components configured to be executed by one or more processors to perform one or more computation operations, as described herein.

In some aspects, the ML model may include a neural network. As shown, the ML model may include a body module 402 configured to receive a set 404 of model inputs. The body module 402 may include any number of layers 406, each layer having any number of neurons 408. The body module 402 may extract a set 410 of common features based at least in part on the set 404 of model inputs. In some aspects, for example, the ML model may be used to estimate an interference distribution on different sub-bands and/or slots.

The ML model may include a plurality of head modules 412, 414, and 416 (shown as "Head 1," "Head 2," . . . , "Head N"). The head modules 412, 414, and 416 each may receive the set 410 of common features extracted by the body module 402 and determine, based at least in part on the set 410 of common features, a plurality of estimated and/or predicted parameter values 418, 420, and 422, respectively. In some aspects, a head 412, 414, or 416 module may generate an estimated and/or predicted parameter value 418, 420, or 422, respectively, based at least in part on minimizing a loss function associated with the corresponding parameter.

In some aspects, the ML model may include only one head module, two head modules 412 and 414, three head modules 412, 414, and 416, or more than three head modules 412, 414, and 416. In some aspects, each head module 412, 414, and 416 may include a neural network and/or a portion of a neural network. For example, in some aspects, a head module 412, 414, or 416 may include a single neuron, a single layer including one or more neurons, or a plurality of layers, each of which includes one or more neurons. In some aspects, as shown in FIG. 4, each head module 412, 414, and 416 generates only one estimated and/or predicted parameter value 418, 420, or 422 of the plurality of estimated and/or predicted parameter values 418, 420, and 422.

Aspects of the ML model may be configured to determine any number of different types of estimated and/or predicted parameter values. For example, in some aspects, the set 404 of model inputs may be associated with a received signal (e.g., a reference signal). For example, in some aspects, the set 404 of model inputs may include measurements obtained based on the received signal such as, for example, measurements of amplitude, phase, wavelength, periodicity, signal-to-noise-plus-interference ratio (SINR), signal-to-noise ratio (SNR), reference signal received power (RSRP), and/or Doppler spread, among other examples. In some aspects, for example, the plurality of estimated and/or predicted parameter values 418, 420, and 422 may include a plurality of estimated and/or predicted interference distributions associated with a plurality of resources of a set of resources.

The set 404 of model inputs may correspond to a set of resources and the ML model may, in some aspects, perform calculations based on a per-resource granularity. For example, a head module 412, 414, and/or 416 of the ML model may determine an estimated and/or predicted parameter on a per-resource granularity basis (e.g., per slot, per sub-slot, per symbol, per resource block (RB), per subchannel, per channel, per beam, per bandwidth part, and/or per bandwidth, among other examples).

The plurality of estimated and/or predicted parameter values 418, 420, and 422 may include estimated and/or predicted values of a plurality of parameters corresponding to the set of resources associated with the signal. In some aspects, for example, the plurality of estimated and/or predicted parameter values 418, 420, and 422 may include at least one of an estimated and/or predicted parameter value associated with a current resource of the set of resources or a predicted parameter value associated with a future resource of the set of resources. In this way, for example, aspects of the ML model may be used to facilitate real-time wireless communication operations and/or to facilitate future wireless communication operations.

In some aspects, for example, the plurality of estimated and/or predicted parameter values 418, 420, and 422 may include a plurality of values associated with a set of estimated and/or predicted CSI parameter values. In some aspects, for example, the plurality of estimated and/or predicted parameter values 418, 420, and 422 may include at least one estimated and/or predicted CSI parameter value and at least one estimated and/or predicted interference parameter value. In some aspects, for example, the plurality of estimated and/or predicted parameter values 418, 420, and 422 may include a first estimated and/or predicted parameter value corresponding to a first parameter and a second estimated and/or predicted parameter value corresponding to a second parameter that is different than the first parameter, where the first estimated and/or predicted parameter value is based at least in part on the at least one reference signal, and where the second estimated and/or predicted parameter value is based at least in part on the at least one reference signal.

In some aspects, different head modules 412, 414, and 416 may determine different estimated and/or predicted values for a parameter associated with a reference signal. For example, the same set 404 of model inputs may be utilized to estimate a parameter value on different resources. In some aspects, the plurality of estimated and/or predicted parameter values 418, 420, and 422 may include a first estimated and/or predicted parameter value corresponding to a parameter in connection with a first resource and a second estimated and/or predicted parameter value corresponding to the parameter in connection with a second resource that is different than the first resource, where the first estimated and/or predicted parameter value is based at least in part on the at least one reference signal, and where the second estimated and/or predicted parameter value is based at least in part on the at least one reference signal. For example, different head modules 412, 414, and 416 may determine different estimated and/or predicted values for a parameter, where each head module 412, 414, and 416 determines an estimated and/or predicted value corresponding to a beam of a plurality of beams.

As indicated above, FIG. 4 is provided as an example. Other examples may differ from what is described with regard to FIG. 4. In various aspects, the ML model may be used to determine any number of different estimated and/or predicted parameter values corresponding to any number of different parameters. In some aspects, estimated and/or predicted parameter values output by different head modules may be used to derive other estimated and/or predicted parameter values. For example, a network node may use estimated and/or predicted parameter values determined using the ML model as inputs to a function to derive one or more additional estimated and/or predicted parameter values.

ML models as described in FIG. 4 are generally trained based on vectors of training data which have fixed dimensions. Thus, such ML models typically only accept input vectors of equal dimensions. Aspects of the present disclosure provide apparatuses and techniques that allow to use ML models as illustrated in FIG. 4 also for input data vectors of dynamically and/or semi-statically changing dimension.

FIG. 5 is a diagram illustrating resource grids including different exemplary signal types that can be used for RSs. FIG. 5 depicts four exemplary signal types that may be used as RSs, e.g., CSI-RS. However, the present disclosure is not limited to the depicted cases. Further possible CSI-RS types can for example be found in 3GPP TS 38.211—Table 7.4.1.5.3-1. The depicted cases correspond to rows 1, 2, 11 and 17 of this table. Also, CSI-RSs are used herein as merely an example. Other reference signals may be used in accordance with the present disclosure.

As is depicted in FIG. 5, RSs may comprise different numbers of resource elements (REs). In the resource grids depicted in FIG. 5, the horizontal axes correspond to the time axes and show REs in time domain (i.e., OFDM symbols). The vertical axes correspond to the frequency axes and show REs in frequency domain (i.e., subcarriers). Each resource grid in FIG. 5 shows 14 OFDM symbols and 12 subcarriers, i.e., each resource grid shows 168 REs.

The REs that have been marked by hatching in the resource grids are REs which can be used by a BS to transmit and by a UE to receive a RS. Each type of hatching of the REs corresponds to a different Code Division Multiplexing (CDM) group.

For example, a RS may comprise three REs, as is shown in example 510 of FIG. 5 (Row 1 of 3GPP TS 38.211—Table 7.4.1.5.3-1). The REs may be in the same OFDM symbol, for example in the zeroth OFDM symbol, and may be distributed inconsecutively on the second, sixth and tenth subcarrier.

In example 520 depicted in FIG. 5 (Row 2 of 3GPP TS 38.211—Table 7.4.1.5.3-1) the RS may comprise only one RE which may be in the zeroth OFDM symbol and the tenth subcarrier.

In example 530 depicted in FIG. 5 (Row 11 of 3GPP TS 38.211—Table 7.4.1.5.3-1), the RS may comprise 12 REs, which may be in the zeroth and first OFDM symbol and be distributed partly consecutive over the subcarriers, e.g., in the second and third, sixth and seventh and tenth and eleventh subcarrier.

In example 540 depicted in FIG. 5 (Row 17 of 3GPP TS 38.211—Table 7.4.1.5.3-1), the RS may comprise 32 REs which may be distributed partly consecutively in time and in frequency domain.

As is shown in FIG. 5, RSs may comprise one or multiple REs. In some cases, the multiple REs of the RS may correspond to the same or different CDM groups.

As indicated above, FIG. 5 is provided as an example. Other examples may differ from what is described with regard to FIG. 5.

Figure 6:
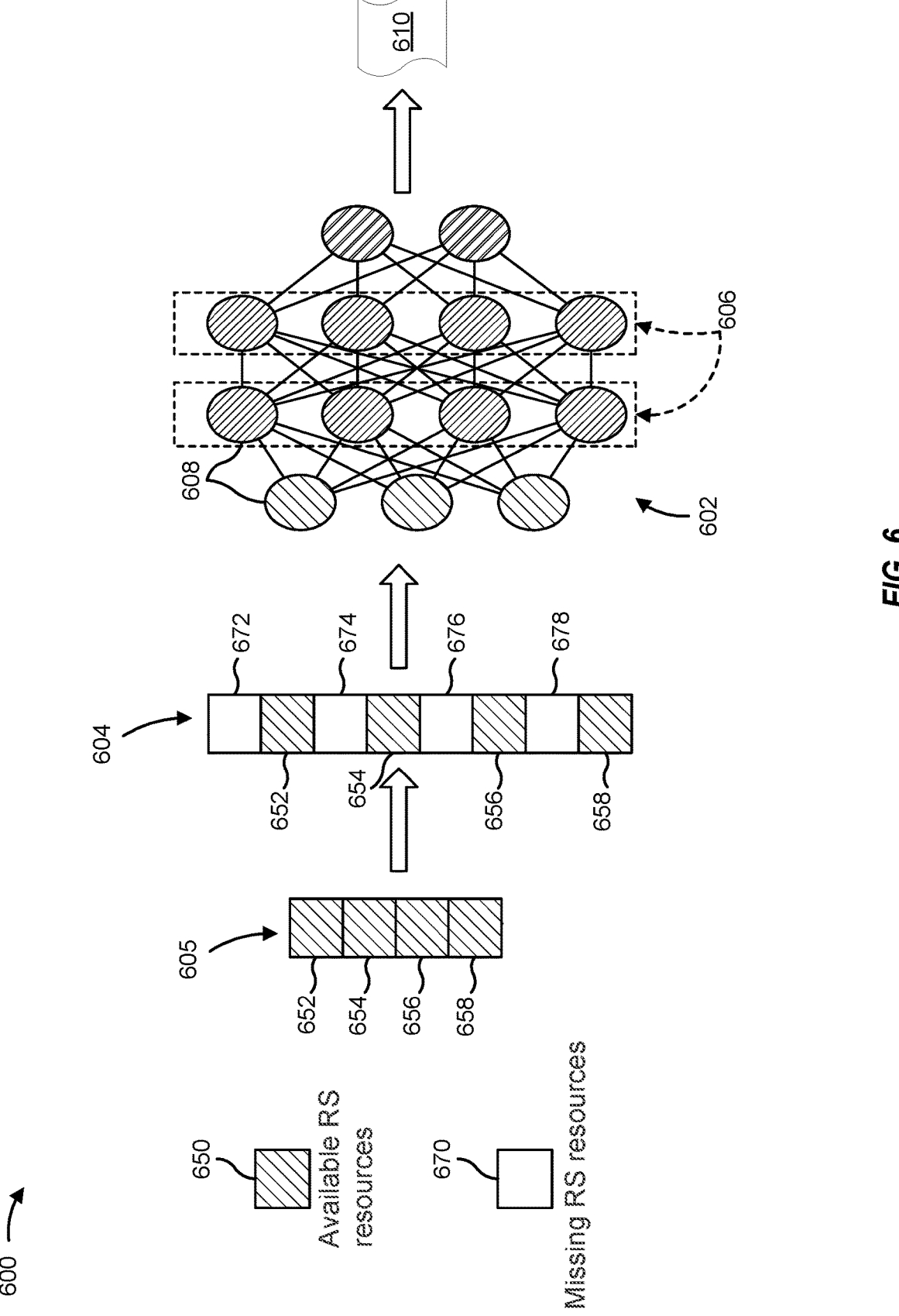
FIG. 6 is a conceptual diagram illustrating an example process of imputing missing inputs for a set of input data of a deep learning model, in accordance with some aspects of the present disclosure.

FIG. 6 is a diagram illustrating an example 600 of a ML model, in accordance with the present disclosure. In some aspects, the ML model may be a multi-head ML model as discussed with reference to FIG. 4. In some aspects, the ML model may be implemented on a UE. For example, the ML model may include one or more software components configured to be executed by one or more processors to perform one or more computation operations, as described herein.

In some aspects, the ML model may include a neural network. As shown, the ML model may include a neural network 602 configured to receive a set 604 of model inputs. The neural network 602 may include any number of hidden layers 606, each hidden layer having any number of neurons 608. The neural network 602 may extract a set 610 of common features based at least in part on the set 604 of model inputs. In some aspects, for example, the ML model may be used to estimate an interference distribution on different sub-bands and/or slots.

In some aspects, the set 604 of model inputs that the ML model is configured to receive may have fixed dimensions. As is exemplary shown in FIG. 6, the set 604 of model inputs may consist of eight reference signal (RS) resource elements. As described above, the set of model inputs is generally based on RSs received from a network node. In some cases, the UE may receive RSs that have different configuration than expected by the ML model. As is shown exemplary in FIG. 6, the UE may receive four available RS resources 650 in a RS 605, namely RS resources 652, 654, 656 and 658.

Based on determining a mismatch between the available resources and the set of resources the ML model is configured to receive, the UE may determine that there are some missing RS resources 670. In some aspects, the UE may use estimated values for resources 672, 674, 676 and 678 to generate an input signal which can be processed by the ML model.

In some aspects, the input values may be generated based on linear interpolation or Fast Fourier Transform (FFT) interpolation. I.e., the UE may calculate a fit function of some or all available resources 652, 654, 656 and 658 and interpolate based on the fit function to find the estimated resources 672, 674, 676 and 678. The interpolation may be one-dimensional or two-dimensional.

In some aspects, the UE may calculate a statistical measure for the available resources 652 and 654 and use the statistical measure as estimated value for resource 674. In some aspects, the UE may use the same value for all missing resources 672, 674, 676 and 678. In some aspects, the UE may use different values the missing resources 672, 674, 676 and 678.

In some aspects, the UE may use statistical imputation to find the estimated values for resources 672, 674, 676 and 678. In some cases, the received reference signal types may change over the course of communication. In some cases, the UE may use resources from previously received RS signals to impute the missing resources 670. For example, the UE may calculate a statistical measure (e.g. a mean, median or the like) of some previously received RS resources and use the statistical imputations to find the estimated values for resources 672, 674, 676 and 678.

In some aspects, the UE may use oversampling to find the estimated values resources 672, 674, 676 and 678. I.e., some or all of the available RS resources 650 may be used as the estimated value for resources 672, 674, 676 and 678. For example, the values of RS resources 652, 654, 656 and 658 may be copied, such that available resource 652 and estimated resource 672 are equal, available resource 654 and estimated resource 674 are equal available resource 656 and estimated resource 676 are equal and available resource 658 and estimated resource 678 are equal.

In some cases, only some available resources may be used for oversampling. For example, only resources 652 and 654 may be used, such that for estimated resources 672 and 674, the value of available resource 652 is used and for estimated resources 676 and 678, available resource 654 is used. It is to be understood that these are merely examples and that other combinations for oversampling are also possible.

In some aspects, the UE may utilize a second ML model to impute estimated resources 672, 674, 676 and 678 from the available resources 652, 654, 656 and 658.

In some aspects, the UE may receive, from a network node, an indication which of the above-described methods it should use. Because the network node may communicate with many different UEs, it may have some knowledge of the network conditions, such as an interference level at the UE, a resource occupancy level of the network node, a characteristic Doppler spread of the CSI or a characteristic delay spread of the CSI.

Based on knowing the current and previous conditions of the network, the network node may configure the UE to use different methods for finding/calculating the values of estimated resources 672, 674, 676 and 678. For example, if the network node determines that the current network conditions have changed substantially with respect to previous network conditions, it may be advantageous to indicate to the UE to use oversampling or interpolation for finding the estimated resources 672, 674, 676 and 678. In some aspects, the network node may determine that the change is "substantial" based on a threshold value.

In some cases, the network node may determine that the condition of the network has not substantially changed with respect to the previous network condition. In this case, it may be advantageous to indicate to the UE to use statistical imputation based on previously received RS signals to find the estimated resources 672, 674, 676 and 678.

In some aspects, the network node may transmit to the UE a set of RS resources to use as estimated resources 672, 674, 676 and 678. I.e., the network node may transmit a RS which contains the available resources 650 and may further transmit a second signal which contains the missing resources 670.

As indicated above, FIG. 6 is provided as an example. Other examples may differ from what is described with regard to FIG. 6.

Figure 7:
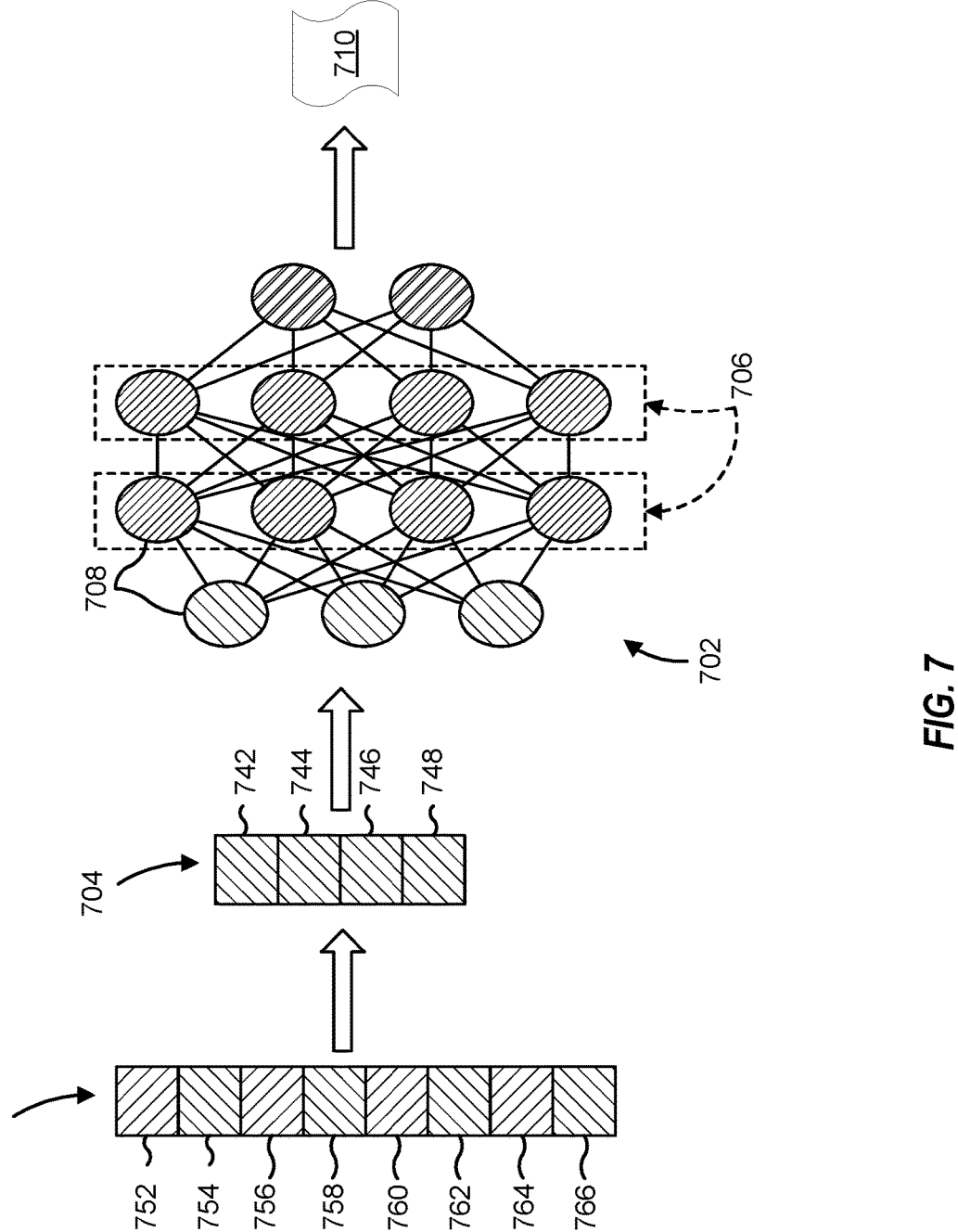
FIG. 7 is a conceptual diagram illustrating an example process of undersampling a reference signal for a set of input data of a deep learning model, in accordance with some aspects of the present disclosure.

FIG. 7 is a diagram illustrating an example 700 of a ML model, in accordance with the present disclosure. In some aspects, the ML model may be a multi-head ML model. In some aspects, for example, the ML model may be implemented on a user equipment. For example, the ML model may include one or more software components configured to be executed by one or more processors to perform one or more computation operations, as described herein.

In some aspects, the ML model may include a neural network. As shown, the ML model may include a neural network 702 configured to receive a set 704 of model inputs. The neural network 702 may include any number of hidden layers 706, each hidden layer having any number of neurons 708. The neural network 702 may extract a set 710 of common features based at least in part on the set 704 of model inputs. In some aspects, for example, the ML model may be used to estimate communication parameters relevant for the UE, such as an interference distribution on different sub-bands and/or slots or beam forming parameters etc.

In some aspects, the set 704 of model inputs that the ML model is configured to receive may have fixed dimensions. As is exemplary shown in FIG. 7, the set 704 of model inputs may consist of four reference signal (RS) resources, e.g., four OFDM REs that carry the RS. As described above, the set of model inputs is generally based on RSs received from a network node. In some cases, the UE may receive RSs that have a different configuration than expected by the ML model. As is shown exemplary in FIG. 7, the UE may receive a RS 705 comprising eight available RS resources 752, 754, 756, 758, 760, 762, 764 and 766.

Based on determining a mismatch between the received RS resources and the set of RS resources the ML model is configured to receive, the UE may determine that there are more RS resources in the RS 705 available than are required by the ML model. In some aspects, the UE may use undersampling of the reference signal to create a set 704 of model inputs that the ML model is configured to receive. In such a situation, generating the set 704 of model inputs may be based on reducing the quantity of RS resources in the received RS 705.

In some aspects, undersampling may include using only four of the eight received RS resources as the set 704 of input models. For example, the received resources 754, 758, 762 and 766 may be bundled to create set 704 of model inputs. In this example, resource 754 could be used as model input 742, resource 758 could be used as model input 744, resource 762 could be used as model input 746 and resource 766 could be used as model input 748.

In some aspects, reducing the quantity of received RS resources may comprise partitioning the received RS resources into clusters. For example, the RS resources of the received RS 705 may be partitioned in four clusters, each cluster comprising two RS resources. The UE may then calculate a statistical measure (e.g. a mean, a median, or the like) for each cluster and use the statistical measures as model inputs. For example, the UE may calculate a mean value for the cluster of RS resource 752 and RS resource 754 and use this average as model input 742. As a further example, the UE may calculate a median or a weighted average for the cluster of RS resource 756 and RS resource 758. The UE may then use the median or weighted average as model input 744.

In some aspects, different statistical measures may be calculated for different model inputs of the set 704 of model inputs. In some aspects, the same statistical measure may be calculated for every model input of the set 704 of model inputs.

As indicated above, FIG. 7 is provided as an example. Other examples may differ from what is described with regard to FIG. 7.

FIG. 8 is a flow diagram illustrating example operations for estimating and/or predicting a communication parameter relevant for a UE such as a beam forming parameter used in wireless communications by a UE according to certain aspects of the present disclosure.

According to FIG. 8, the method 800 may comprise receiving, from a network node, a reference signal of a first type (block 810).

Reference signals may serve the reduction of noise in wireless communication by providing a fixed reference value. They may further allow channel and/or beam estimation which consequently allows for proper selection of an advantageous channel/beam which may be used for wireless communication. Selecting a beam/channel with good quality, e.g., based on a channel quality indicator (CQI), improves the efficiency of communication.

According to FIG. 8, the method 800 may comprise determining, based on the reference signal, an input signal of a second type (block 820). In some aspects of the present disclosure, signals of the second type may be associated with training a first machine learning (ML) model applied by the UE to estimate a parameter used in wireless communications by the UE.

In some aspects of the present disclosure, signals of the second type may have been used for training a first ML model.

In some aspects, the first type of signals and the second type of signals may be different from each other.

In some aspects, RSs of the first type may comprise a first quantity of resource elements (REs) and the input signal may comprise a second quantity of REs. In some aspects, the second quantity of REs may be different from the first quantity of REs.

In some aspects, determining the input signal may comprise receiving, from the network node, an indication for determining the input signal of the second type; and determining the input signal based on the indication.

This allows for the UE to determine the input signal based on the configuration by the network node. Because the network node has better knowledge of the network condition (interference, density of communicating nodes, geographic properties, etc.), a configuration by the network node allows for improved flexibility in the presence of changing network conditions and improved efficiency of communication.

In some aspects, the method 800 may further comprise transmitting UE capability information to the network node. In some aspects, the indication may be based on the UE capability information.

By transmitting UE capability information, the network node is given the possibility to choose an appropriate indication for determining the input signal based on its further knowledge of the UE capability. Consequently, this aspect also allows for improved efficiency of communication.

In some aspects, determining the input signal based on the indication may comprise one or more of: a linear interpolation algorithm, an FFT interpolation algorithm, a one-dimensional or two-dimensional interpolation algorithm, a second ML model trained to impute missing input data for the first ML model, and a statistical imputation algorithm based on one or more previously transmitted RSs.

These are example algorithms that may be used to determine the input signal from the received reference signal. Depending on network condition and UE capability, different algorithms may be appropriate. For example, the UE capability information may indicate that the ML model used by the UE has been trained by a specific configuration of reference signal. Based on the network condition, the base station may find it appropriate to transmit a reference signal of a different configuration. If this reference signal comprises less REs than required by the ML model, linear interpolation, statistical imputation or the like may be the most efficient ways for determining the input signal.

In some aspects, determining the input signal may comprise undersampling the reference signal to determine the input signal based on reducing the first quantity of REs to the second quantity of REs, if the first quantity of REs is larger than the second quantity of REs.

By undersampling, the quantity of REs may be reduced to create an appropriate data set for inputting into the ML model.

In some aspects, reducing the first quantity of REs may comprise partitioning the first quantity of REs into a plurality of clusters and calculating a statistical measure for each one of the plurality of clusters. In some aspects, each statistical measure may correspond to a part of the second quantity of REs.

This allows for a simple way of computing the input signal from the reference signal comprising more REs than required. Thus, by means of this feature, efficiency in the use of computational resources an in wireless communication can be improved.

In some aspects, determining the input signal may comprise transmitting, to the network node, UE capability information indicating the second type, receiving, from the network node, a second signal, and determining the input signal based on merging the RS and the second signal.

If appropriate considering the general network conditions, the network node may transmit further data with the reference signal, such that the UE may then merge the reference signal and the second signal to create an appropriate input signal for the ML model. This allows for a more efficient use of computational resources of the UE and thus improves the efficiency of communication.

In some aspects, determining the input signal may comprise transmitting, to the network node, UE capability information indicating the second type and receiving, from the network node, a second RS of the second type.

In some cases, considering the general network conditions, the network node may deem it appropriate to transmit a reference signal of the expected type to the UE. This avoids the necessity of calculating the input signal by some algorithm and thus allows for a more efficient use of computational resources and thus improves communication efficiency.

As also shown on FIG. 8, the method 800 may comprise applying the input signal of the second type to the first ML model to estimate the parameter used in wireless communications by the UE (block 830).

As indicated above, FIG. 8 is provided as an example. Other examples may differ from what is described with regard to FIG. 8.

FIG. 9 is a flow diagram illustrating example operations for estimating and/or predicting a communication parameter relevant for a UE such as a beam forming parameter used in wireless communications by a network node according to certain aspects of the present disclosure.

According to FIG. 9, the method 900 for wireless communication may comprise determining a transformation configured to transform a first RS of a first type to an input signal of a second type (block 910). In some aspects, signals of the second type may be associated with training a first ML model applied by a UE to estimate a parameter used in wireless communications by the UE.

Because the network node may have sufficient information about the network conditions and about RSs received from multiple UEs, it is advantageous for the network node to determine which transformation should be used by the UE. This allows for a more efficient use of computational resources and thus improves communication efficiency for the UE and the network.

According to FIG. 9, the method 900 for wireless communication may comprise transmitting, to the UE, an indication of the transformation (block 920).

The transmission of the indication allows for the UE to choose an appropriate transformation to generate the input signal. This transformation may then be the most advantageous transformation, which the UE is able to choose due to the network node's knowledge of the network conditions.

As is further shown in FIG. 9, the method 900 for wireless communication may comprise transmitting, to the UE, the reference signal of the first type (block 930).

The transmission of RSs serves the purpose of beam measurement and the choosing of an efficient beam for communication between the UE and the network node.

In some aspects, the transformation may comprise one or more of: a linear interpolation algorithm, an FFT interpolation algorithm, a one-dimensional or two-dimensional interpolation algorithm, a second ML model trained to impute missing input data for the first ML model, a statistical imputation algorithm based on one or more previously transmitted RSs, and oversampling the reference signal.

These are example algorithms that may be used to determine the input signal from the received reference signal. Depending on network condition and UE capability, different algorithms may be appropriate. For example, UE capability information may indicate that the ML model used by the UE has been trained by a specific configuration of reference signal. Based on the network condition, the network node may find it appropriate to transmit a reference signal of a different configuration. If this reference signal comprises less REs than required by the ML model, linear interpolation, statistical imputation or the like may be the most efficient ways for determining the input signal.

In some aspects, the RS of the first type may comprise a first quantity of REs and the input signal comprises a second quantity of REs.

In some aspects, the transformation may comprise undersampling the reference signal to determine the input signal based on reducing the first quantity of REs to the second quantity of REs, if the first quantity of REs is larger than the second quantity of REs.

Undersampling allows the reduction of the received reference signal to match with the input signal expected for the ML model. Thus, undersampling provides a simple way of determining the input signal, thereby improving the efficiency of wireless communication and conserving computational resources.

In some aspects, determining the transformation may comprise receiving one or more of: capability information from the UE; and CSI from a plurality of UEs; and determining the transformation based on one or more of: the received capability information; and the received CSI.

This allows the network node to take the capability of the UE and the general conditions of the wireless network into account when determining the transformation. Consequently, the flexibility of the wireless communication is increased.

In some aspects determining the transformation may comprise determining a second signal configured to generate the input signal of the second type by merging the RS of the first type and the second signal. In some aspects the indication may comprise the second signal.

If appropriate considering the general network conditions, the network node may transmit further data with the reference signal, such that the UE may then merge the reference signal and the second signal to create an appropriate input signal for the ML model. This allows for a more efficient use of computational resources of the UE and thus improves the efficiency of communication.

In some aspects, determining the transformation based on the received CSI may comprise estimating an interference level for the UE.

In some aspects, determining the transformation may further comprise determining, based on the received CSI, if a change of a condition of the network node or CSI characteristics exceeds a threshold value, determining that the transformation comprises oversampling, undersampling or an interpolation algorithm, if the threshold value is exceeded, and determining that the transformation comprises statistical imputation or imputation based on ML, if the threshold value is not exceeded.

The condition may include one or more of: an interference level at the UE, a resource occupancy level of the network node, a characteristic Doppler spread of the CSI, and a characteristic delay spread of the CSI.

By using ambient conditions of the radio network, e.g., knowledge on the interference present in a radio cell, the wireless node may choose the most appropriate transformation to fit the current and previous conditions of the network. For example, if the conditions have changed by a large amount, it may be advantageous to use interpolation, oversampling or undersampling as a transformation, and if the change is comparably little, statistical imputation or imputation based on ML may be advantageous.

Consequently, the flexibility of the network can be increased as the wireless node is able to indicate to the UE a transformation which is appropriate for the current network condition. Furthermore, the likelihood of good beam parameter estimation and/or prediction is increased by using the appropriate transformation.

In some aspects, the method 900 may further comprise receiving, from the UE, UE capability information indicating the second type and transmitting, to the UE a second RS of the second type.

By transmitting a second RS corresponding to the UE capability, the wireless node can adapt to the appropriate conditions of the first ML model. Thus, computational resources which would otherwise be required for determining the input signal can be saved because the transmitted reference signal already conforms to the type of signals which have been used to train the first ML model.

As indicated above, FIG. 9 is provided as an example. Other examples may differ from what is described with regard to FIG. 9.

Figure 10:
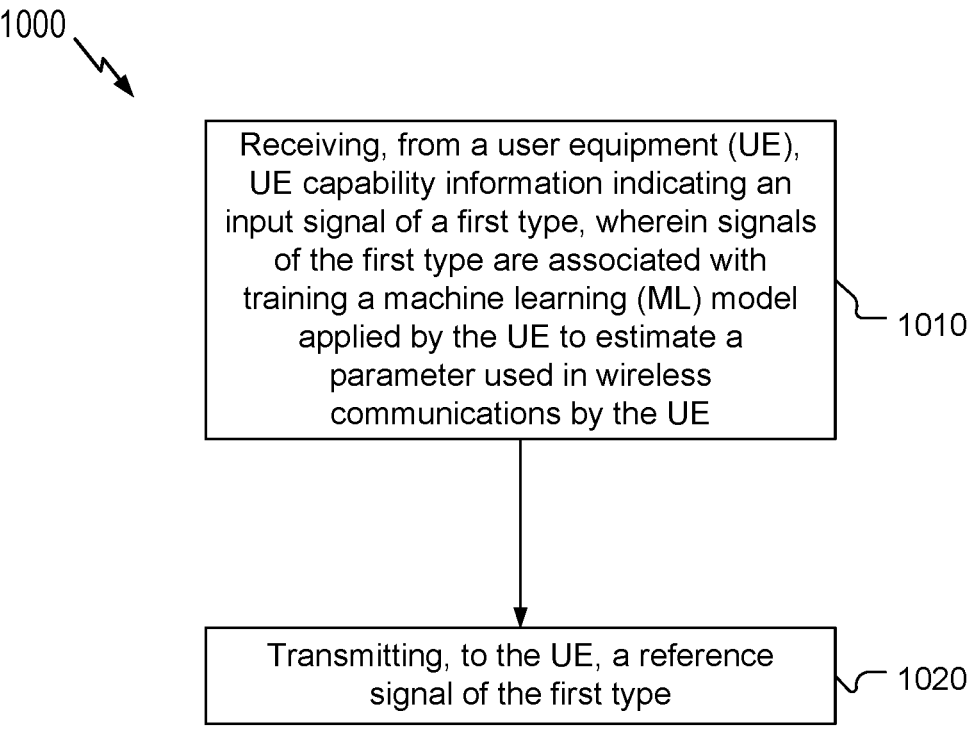
FIG. 10 is a flow chart illustrating an example of a process of wireless communication by a network node, e.g., a BS, in accordance with some aspects of the present disclosure.

According to FIG. 10, the method 1000 for wireless communication may comprise receiving, from a UE, UE capability information indicating an input signal of a first type (block 1020). In some aspects, signals of the first type may be associated with training a ML model applied by the UE to estimate a parameter used in wireless communications by the UE.

As is further shown in FIG. 10, the method 1000 may comprise transmitting, to the UE, a reference signal of the first type (block 1020).

By transmitting a reference signal of the appropriate type (i.e., the type that has been used to train the ML model), determining the input signal from the reference signal is no longer necessary. In this way, the original reference signal can be inputted into the ML model to estimate or predict the one or more communication parameters. This conserves computational resources while increasing the efficiency of wireless communication.

As indicated above, FIG. 10 is provided as an example. Other examples may differ from what is described with regard to FIG. 10.

According to FIG. 11, a method 1100 for wireless communication may comprise receiving, from a UE, UE capability information indicating input signals of a plurality of signal types (block 1110). In some aspects, signals of each of the plurality of the signal types may be associated with training one of a plurality of ML models applied by the UE to estimate a parameter used in wireless communications by the UE.

According to FIG. 11, the method 1100 for wireless communication may comprise selecting a first signal type from the plurality of signal types (block 1120).

In some aspects, the UE may have several ML models trained with different input parameters. Thus, it may be advantageous for the network node to receive from the UE an indication of the several signal types that have been used for training the different ML models. This increases the flexibility of the network.

In some aspects, selecting the first signal type may comprise receiving, from a plurality of UEs, CSI and selecting the first signal type based on the received CSI.

In some aspects, selecting the first signal type based on the received CSI may comprise estimating an interference level for the UE.

By selecting the first signal type based on the CSI of a plurality of UEs, the network node can flexibly choose an appropriate RS which is advantageous to the current network condition, e.g., to the estimated interference level. Consequently, flexibility is increased while also increasing the overall communication efficiency.

As is further shown by FIG. 11, the method 1100 for wireless communication may comprise transmitting, to the UE, a reference signal (RS) of the first signal type.

As indicated above, FIG. 11 is provided as an example. Other examples may differ from what is described with regard to FIG. 11.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

In the following, several further aspects of the present disclosure are presented:

Aspect 1. A method for wireless communication by a user equipment (UE), comprising: receiving, from a network node, a reference signal (RS) of a first type; determining, based on the reference signal, an input signal of a second type, wherein signals of the second type are associated with training a first machine learning (ML) model applied by the UE to estimate a parameter used in wireless communications by the UE; and applying the input signal of the second type to the first ML model to estimate the parameter used in wireless communications by the UE.

Aspect 2. The method of aspect 1, wherein the RS of the first type comprises a first quantity of resource elements (REs) and the input signal comprises a second quantity of REs.

Aspect 3. The method of any one of aspects 1 and 2, wherein determining the input signal comprises: receiving, from the network node, an indication for determining the input signal of the second type; and determining the input signal based on the indication.

Aspect 4. The method of any one of aspects 1 to 3, further comprising: transmitting UE capability information to the network node; and wherein the indication is based on the UE capability information.

Aspect 5. The method of any one of aspects 1 to 4, wherein determining the input signal based on the indication comprises one or more of: a linear interpolation algorithm, a Fast Fourier Transformation (FFT) interpolation algorithm, a one-dimensional or two-dimensional interpolation algorithm, a second ML model trained to impute missing input data for the first ML model, and a statistical imputation algorithm based on one or more previously transmitted RSs.

Aspect 6. The method of any one of aspects 2 to 5, wherein determining the input signal comprises: undersampling the reference signal to determine the input signal based on reducing the first quantity of REs to the second quantity of REs, if the first quantity of REs is larger than the second quantity of REs.

Aspect 7. The method of any one of aspects 2 to 6, wherein reducing the first quantity of REs comprises: partitioning the first quantity of REs into a plurality of clusters; and calculating a statistical measure for each one of the plurality of clusters, wherein each statistical measure corresponds to a part of the second quantity of REs.

Aspect 8. The method of any one of aspects 1 to 7, wherein determining the input signal comprises: transmitting, to the network node, UE capability information indicating the second type; receiving, from the network node, a second signal; and determining the input signal based on merging the RS and the second signal.

Aspect 9. The method of any one of aspects 1 to 8, wherein determining the input signal comprises: transmitting, to the network node, UE capability information indicating the second type; and receiving, from the network node, a second RS of the second type.

Aspect 10. A method for wireless communication by a network node, comprising: determining a transformation configured to transform a first reference signal (RS) of a first type to an input signal of a second type, wherein signals of the second type are associated with training a first machine learning (ML) model applied by a User Equipment (UE) to estimate a parameter used in wireless communications by the UE; transmitting, to the UE, an indication of the transformation; and transmitting, to the UE, the first reference signal (RS) of the first type.

Aspect 11. The method of aspect 10, wherein the transformation comprises one or more of: a linear interpolation algorithm, a Fast Fourier Transformation (FFT) interpolation algorithm, a one-dimensional or two-dimensional interpolation algorithm, a second ML model trained to impute missing input data for the first ML model, a statistical imputation algorithm based on one or more previously transmitted RSs, and oversampling the first reference signal.

Aspect 12. The method of any of aspects 10 and 11, wherein the RS of the first type comprises a first quantity of resource elements (REs) and the input signal comprises a second quantity of REs.

Aspect 13. The method of any one of aspects 10 to 12, wherein the transformation comprises undersampling the first reference signal to determine the input signal based on reducing the first quantity of REs to the second quantity of REs, if the first quantity of REs is larger than the second quantity of REs.

Aspect 14. The method of any one of aspects 10 to 13, wherein determining the transformation comprises: receiving one or more of: capability information from the UE; and channel state information (CSI) from a plurality of UEs; and determining the transformation based on one or more of: the received capability information; and the received CSI.

Aspect 15. The method of any one of aspects 10 to 14, wherein determining the transformation comprises: determining a second signal configured to generate the input signal of the second type by merging the RS of the first type and the second signal, and wherein the indication comprises the second signal.

Aspect 16. The method of any one of aspects 10 to 15, wherein determining the transformation further comprises: determining, based on the received CSI, if a change of a condition of the network node or CSI characteristics exceeds a threshold value; determining that the transformation comprises oversampling, undersampling or an interpolation algorithm, if the threshold value is exceeded; and determining that the transformation comprises statistical imputation or imputation based on ML, if the threshold value is not exceeded.

Aspect 17. The method of aspect 16, wherein the condition includes one or more of: an interference level at the UE, a resource occupancy level of the network node, a characteristic doppler spread of the CSI, and a characteristic delay spread of the CSI.

Aspect 18. The method of any one of aspects 10 to 17, further comprising: receiving, from the UE, UE capability information indicating the second type; and transmitting, to the UE, a second RS of the second type.

Aspect 19. A method for wireless communication by a network node, comprising: receiving, from a user equipment (UE), UE capability information indicating an input signal of a first type, wherein signals of the first type are associated with training a machine learning (ML) model applied by the UE to estimate a parameter used in wireless communications by the UE; and transmitting, to the UE, a reference signal of the first type.

Aspect 20. A method for wireless communication by a network node, comprising: receiving, from a user equipment (UE), UE capability information indicating input signals of a plurality of signal types, wherein signals of each of the plurality of the signal types are associated with training one of a plurality of machine learning (ML) models applied by the UE to estimate a parameter used in wireless communications by the UE; selecting a first signal type from the plurality of signal types; and transmitting, to the UE, a reference signal (RS) of the first signal type.

Aspect 21. The method of aspect 20, wherein selecting the first signal type comprises: receiving, from a plurality of UEs, channel state information (CSI); and selecting the first signal type based on the received CSI.

Aspect 22. The method of any one of aspects 20 and 21, wherein selecting the first signal type based on the received CSI comprises estimating an interference level for the UE.

Aspect 23. An apparatus for wireless communication by a user equipment (UE), comprising: means for receiving, from a network node, a reference signal (RS) of a first type; means for determining, based on the reference signal, an input signal of a second type, wherein signals of the second type are associated with training a first machine learning (ML) model applied by the UE to estimate a parameter used in wireless communications by the UE; and means for applying the input signal of the second type to the first ML model to estimate the parameter used in wireless communications by the UE.

Aspect 24. The apparatus of aspect 23, wherein the RS of the first type comprises a first quantity of resource elements (REs) and the input signal comprises a second quantity of REs.

Aspect 25. The apparatus of any one of aspects 23 and 24, wherein the means for determining the input signal is configured to receive, from the network node, an indication for determining the input signal of the second type; and determine the input signal based on the indication.

Aspect 26. The apparatus of any one of aspects 23 to 25, further comprising: means for transmitting UE capability information to the network node; and wherein the indication is based on the UE capability information.

Aspect 27. The apparatus of any one of aspects 23 to 26, wherein the means for determining the input signal based on the indication is configured to determine the input signal based on one or more of: a linear interpolation algorithm, a Fast Fourier Transformation (FFT) interpolation algorithm, a one-dimensional or two-dimensional interpolation algorithm, a second ML model trained to impute missing input data for the first ML model, and a statistical imputation algorithm based on one or more previously transmitted RSs.

Aspect 28. The apparatus of any one of aspects 24 to 27, wherein the means for determining the input signal is configured to undersampling the reference signal to determine the input signal based on reducing the first quantity of REs to the second quantity of REs, if the first quantity of REs is larger than the second quantity of REs.

Aspect 29. The apparatus of aspect 28, wherein the means for determining the input signal is configured to reduce the first quantity of REs based on partitioning the first quantity of REs into a plurality of clusters; and calculating a statistical measure for each one of the plurality of clusters, wherein each statistical measure corresponds to a part of the second quantity of REs.

Aspect 30. The apparatus of any one of aspects 23 to 29, wherein the means for determining the input signal is configured to: transmit, to the network node, UE capability information indicating the second type; receive, from the network node, a second signal; and determine the input signal based on merging the RS and the second signal.

Aspect 31. The apparatus of any one of aspects 23 to 30, wherein the means for determining the input signal is configured to: transmit, to the network node, UE capability information indicating the second type; and receive, from the network node, a second RS of the second type.

Aspect 32. An apparatus for wireless communication by a network node, comprising: means for determining a transformation configured to transform a first reference signal (RS) of a first type to an input signal of a second type, wherein signals of the second type are associated with training a first machine learning (ML) model applied by a User Equipment (UE) to estimate a parameter used in wireless communications by the UE; means for transmitting, to the UE, an indication of the transformation; and means for transmitting, to the UE, the first reference signal (RS) of the first type.

Aspect 33. The apparatus of aspect 32, wherein the transformation comprises one or more of: a linear interpolation algorithm, a Fast Fourier Transformation (FFT) interpolation algorithm, a one-dimensional or two-dimensional interpolation algorithm, a second ML model trained to impute missing input data for the first ML model, a statistical imputation algorithm based on one or more previously transmitted RSs, and oversampling the first reference signal.

Aspect 34. The apparatus of any of aspects 32 or 33, wherein the RS of the first type comprises a first quantity of resource elements (REs) and the input signal comprises a second quantity of REs.

Aspect 35. The apparatus of any one of aspects 32 to 34, wherein the transformation comprises undersampling the first reference signal to determine the input signal based on reducing the first quantity of REs to the second quantity of REs, if the first quantity of REs is larger than the second quantity of REs.

Aspect 36. The apparatus of any one of aspects 32 to 35, wherein the means for determining the transformation is configured to: receive one or more of: capability information from the UE; and channel state information (CSI) from a plurality of UEs; and determine the transformation based on one or more of: the received capability information; and the received CSI.

Aspect 37. The apparatus of any one of aspects 32 to 36, wherein the means for determining the transformation is configured to: determine a second signal configured to generate the input signal of the second type by merging the RS of the first type and the second signal, and wherein the indication comprises the second signal.

Aspect 38. The apparatus of any one of aspects 32 to 37, wherein the means for determining the transformation is configured to: determine, based on the received CSI, if a change of a condition of the network node or CSI characteristics exceeds a threshold value; determine that the transformation comprises oversampling, undersampling or an interpolation algorithm, if the threshold value is exceeded; and determine that the transformation comprises statistical imputation or imputation based on ML, if the threshold value is not exceeded.

Aspect 39. The apparatus of aspect 38, wherein the condition includes one or more of: an interference level at the UE, a resource occupancy level of the network node, a characteristic doppler spread of the CSI, and a characteristic delay spread of the CSI.

Aspect 40. The apparatus of any one of aspect 32 to 39, further comprising: means for receiving, from the UE, UE capability information indicating the second type; and means for transmitting, to the UE, a second RS of the second type.

Aspect 41. An apparatus for wireless communication by a network node, comprising: means for receiving, from a user equipment (UE), UE capability information indicating an input signal of a first type, wherein signals of the first type are associated with training a machine learning (ML) model applied by the UE to estimate a parameter used in wireless communications by the UE; and means for transmitting, to the UE, a reference signal of the first type.

Aspect 42. An apparatus for wireless communication by a network node, comprising: means for receiving, from a user equipment (UE), UE capability information indicating input signals of a plurality of signal types, wherein signals of each of the plurality of the signal types are associated with training one of a plurality of machine learning (ML) models applied by the UE to estimate a parameter used in wireless communications by the UE; means for selecting a first signal type from the plurality of signal types; and means for transmitting, to the UE, a reference signal (RS) of the first signal type.

Aspect 43. The apparatus of aspect 42, wherein the means for selecting the first signal type is configured to: receive, from a plurality of UEs, channel state information (CSI); and select the first signal type based on the received CSI.

Aspect 44. The apparatus of any one of aspects 42 and 43, wherein the means for selecting the first signal type based on the received CSI is configured to select the first signal type further based on estimating an interference level for the UE.

Aspect 45. An apparatus for wireless communication by a user equipment (UE), comprising: a memory; and one or more processors coupled to the memory, the memory and the one or more processors configured to: receive, from a network node, a reference signal (RS) of a first type; determine, based on the reference signal, an input signal of a second type, wherein signals of the second type are associated with training a first machine learning (ML) model applied by the UE to estimate a parameter used in wireless communications by the UE; and apply the input signal of the second type to the first ML model to estimate the parameter used in wireless communications by the UE.

Aspect 46. The apparatus of aspect 45, wherein the RS of the first type comprises a first quantity of resource elements (REs) and the input signal comprises a second quantity of REs.

Aspect 47. The apparatus of any one of aspects 45 and 46, wherein the memory and the one or more processors are configured to determine the input signal based on receiving, from the network node, an indication for determining the input signal of the second type; and determining the input signal based on the indication.

Aspect 48. The apparatus of any one of aspects 45 to 47, wherein memory and the one or more processors are further configured to: transmit UE capability information to the network node; and wherein the indication is based on the UE capability information.

Aspect 49. The apparatus of any one of aspects 45 to 48, wherein the memory and the one or more processors are configured to determine the input signal based on one or more of: a linear interpolation algorithm, a Fast Fourier Transformation (FFT) interpolation algorithm, a one-dimensional or two-dimensional interpolation algorithm, a second ML model trained to impute missing input data for the first ML model, and a statistical imputation algorithm based on one or more previously transmitted RSs.

Aspect 50. The apparatus of any one of aspects 46 to 49, wherein the memory and the one or more processors are configured to undersampling the reference signal to determine the input signal based on reducing the first quantity of REs to the second quantity of REs, if the first quantity of REs is larger than the second quantity of REs.

Aspect 51. The apparatus of aspect 50, wherein the memory and the one or more processors are configured to determine the input signal based on reducing the first quantity of REs based on partitioning the first quantity of REs into a plurality of clusters; and calculating a statistical measure for each one of the plurality of clusters, wherein each statistical measure corresponds to a part of the second quantity of REs.

Aspect 52. The apparatus of any one of aspects 45 to 51, wherein the memory and the one or more processors are configured to determine the input signal based on: transmitting, to the network node, UE capability information indicating the second type; receiving, from the network node, a second signal; and determining the input signal based on merging the RS and the second signal.

Aspect 53. The apparatus of any one of aspects 45 to 52, wherein the memory and the one or more processors configured to determine the input signal based on: transmitting, to the network node, UE capability information indicating the second type; and receiving, from the network node, a second RS of the second type.

Aspect 54. An apparatus for wireless communication by a network node, comprising: a memory; and one or more processors coupled to the memory, the memory and the one or more processors configured to: determine a transformation configured to transform a first reference signal (RS) of a first type to an input signal of a second type, wherein signals of the second type are associated with training a first machine learning (ML) model applied by a User Equipment (UE) to estimate a parameter used in wireless communications by the UE; transmit, to the UE, an indication of the transformation; and transmit, to the UE, the first reference signal (RS) of the first type.

Aspect 55. The apparatus of aspect 54, wherein the transformation comprises one or more of: a linear interpolation algorithm, a Fast Fourier Transformation (FFT) interpolation algorithm, a one-dimensional or two-dimensional interpolation algorithm, a second ML model trained to impute missing input data for the first ML model, a statistical imputation algorithm based on one or more previously transmitted RSs, and oversampling the first reference signal.

Aspect 56. The apparatus of any of aspects 54 and 55, wherein the RS of the first type comprises a first quantity of resource elements (REs) and the input signal comprises a second quantity of REs.

Aspect 57. The apparatus of any one of aspects 54 to 56, wherein the transformation comprises undersampling the first reference signal to determine the input signal based on reducing the first quantity of REs to the second quantity of REs, if the first quantity of REs is larger than the second quantity of REs.

Aspect 58. The apparatus of any one of aspects 54 to 57, wherein the memory and the one or more processors are configured to determine the transformation based on: receiving one or more of: capability information from the UE; and channel state information (CSI) from a plurality of UEs; and determining the transformation based on one or more of: the received capability information; and the received CSI.

Aspect 59. The apparatus of any one of aspects 54 to 58, wherein the memory and the one or more processors are configured to determine the transformation based on: determining a second signal configured to generate the input signal of the second type by merging the RS of the first type and the second signal, and wherein the indication comprises the second signal.

Aspect 60. The apparatus of any one of aspects 54 to 59, wherein the memory and the one or more processors are configured to determine the transformation based on: determining, based on the received CSI, if a change of a condition of the network node or CSI character-istics exceeds a threshold value; determining that the transformation comprises oversampling, undersam-pling or an interpolation algorithm, if the threshold value is exceeded; and determining that the transfor-mation comprises statistical imputation or imputation based on ML, if the threshold value is not exceeded.

Aspect 61. The apparatus of aspect 60, wherein the condition includes one or more of: an interference level at the UE, a resource occupancy level of the network node, a characteristic doppler spread of the CSI, and a characteristic delay spread of the CSI.

Aspect 62. The apparatus of aspect 54, wherein the memory and the one or more processors are further configured to: receive, from the UE, UE capability information indicating the second type; and transmit, to the UE, a second RS of the second type.

Aspect 63. An apparatus for wireless communication by a network node, comprising: a memory; and one or more processors coupled to the memory, the memory and the one or more processors configured to: receive, from a user equipment (UE), UE capability information indicating an input signal of a first type, wherein signals of the first type are associated with training a machine learning (ML) model applied by the UE to estimate a parameter used in wireless communications by the UE; and means for transmitting, to the UE, a reference signal of the first type.

Aspect 64. An apparatus for wireless communication by a network node, comprising: a memory; and one or more processors coupled to the memory, the memory and the one or more processors configured to: receive, from a user equipment (UE), UE capability information indicating input signals of a plurality of signal types, wherein signals of each of the plurality of the signal types are associated with training one of a plurality of machine learning (ML) models applied by the UE to estimate a parameter used in wireless communications by the UE; select a first signal type from the plurality of signal types; and transmit, to the UE, a reference signal (RS) of the first signal type.

Aspect 65. The apparatus of aspect 64, wherein the memory and the one or more processors configured to select the first signal type based on: receiving, from a plurality of UEs, channel state information (CSI); and selecting the first signal type based on the received CSI.

Aspect 66. The apparatus of any one of aspects 64 and 65, wherein the memory and the one or more processors configured to select the first signal type based on estimating an interference level for the UE.

Aspect 67. A non-transitory computer-readable medium storing one or more instructions for determining a position of a wireless node in an operation area or volume, wherein the one or more instructions, when executed by one or more processors, cause the one or more processors to: receive, from a network node, a reference signal (RS) of a first type; determine, based on the reference signal, an input signal of a second type, wherein signals of the second type are associated with training a first machine learning (ML) model applied by the UE to estimate a parameter used in wireless com-munications by the UE; and apply the input signal of the second type to the first ML model to estimate the parameter used in wireless communications by the UE.

Aspect 68. A non-transitory computer-readable medium storing one or more instructions for determining a position of a wireless node in an operation area or volume, wherein the one or more instructions, when executed by one or more processors, cause the one or more processors to: determine a transformation config-ured to transform a first reference signal (RS) of a first type to an input signal of a second type, wherein signals of the second type are associated with training a first machine learning (ML) model applied by a User Equip-ment (UE) to estimate a parameter used in wireless communications by the UE; transmit, to the UE, an indication of the transformation; and transmit, to the UE, the first reference signal (RS) of the first type.

Aspect 69. A non-transitory computer-readable medium storing one or more instructions for determining a position of a wireless node in an operation area or volume, wherein the one or more instructions, when executed by one or more processors, cause the one or more processors to: receive, from a user equipment (UE), UE capability information indicating input sig-nals of a plurality of signal types, wherein signals of each of the plurality of the signal types are associated with training one of a plurality of machine learning (ML) models applied by the UE to estimate a parameter used in wireless communications by the UE; select a first signal type from the plurality of signal types; and transmit, to the UE, a reference signal (RS) of the first signal type.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various aspects. In fact, many of these features may be combined in ways not specifically recited in the claims and/or dis-closed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchange-ably with "one or more." Where only one item is intended, the phrase "only one" or similar language is used. Also, as used herein, the terms "has," "have," "having," and/or the like are intended to be open-ended terms.

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

As used herein, the term "or" is an inclusive "or" unless limiting language is used relative to the alternatives listed. For example, reference to "X being based on A or B" shall be construed as including within its scope X being based on A, X being based on B, and X being based on A and B. In this regard, reference to "X being based on A or B" refers to "at least one of A or B" or "one or more of A or B" due to "or" being inclusive. Similarly, reference to "X being based on A, B, or C" shall be construed as including within its scope X being based on A, X being based on B, X being based on C, X being based on A and B, X being based on A and C, X being based on B and C, and X being based on A, B, and C. In this regard, reference to "X being based on A, B, or C" refers to "at least one of A, B, or C" or "one or more of A, B, or C" due to "or" being inclusive. As an example of limiting language, reference to "X being based on only one of A or B" shall be construed as including within its scope X being based on A as well as X being based on B, but not X being based on A and B.

What is claimed is:

1. A method for wireless communication by a user equipment (UE), comprising:
  receiving, from a network node, a reference signal (RS) of a first type;
  determining, based on the reference signal, an input signal of a second type, wherein signals of the second type are associated with training a first machine learning (ML) model applied by the UE to estimate a parameter used in wireless communications by the UE; and
  applying the input signal of the second type to the first ML model to estimate the parameter used in wireless communications by the UE, wherein the RS of the first type comprises a first quantity of resource elements, REs, and the input signal comprises a second quantity of REs,
wherein determining the input signal comprises: undersampling the reference signal to determine the input signal based on reducing the first quantity of REs to the second quantity of REs, if the first quantity of REs is larger than the second quantity of REs.

2. The method of claim 1, wherein reducing the first quantity of REs comprises:
  partitioning the first quantity of REs into a plurality of clusters; and
  calculating a statistical measure for each one of the plurality of clusters, wherein each statistical measure corresponds to a part of the second quantity of REs.

3. The method of claim 1, wherein determining the input signal comprises:
  receiving, from the network node, an indication for determining the input signal of the second type; and
  determining the input signal based on the indication.

4. The method of claim 3, further comprising:
  transmitting UE capability information to the network node; and
  wherein the indication is based on the UE capability information.

5. The method of claim 3, wherein determining the input signal based on the indication comprises one or more of:
  a linear interpolation algorithm,
  a Fast Fourier Transformation (FFT) interpolation algorithm,
  a one-dimensional or two-dimensional interpolation algorithm,
  a second ML model trained to impute missing input data for the first ML model, and
  a statistical imputation algorithm based on one or more previously transmitted RSs.

6. The method of claim 1, wherein determining the input signal comprises:
  transmitting, to the network node, UE capability information indicating the second type;
  receiving, from the network node, a second signal; and
  determining the input signal based on merging the RS and the second signal.

7. The method of claim 1, wherein determining the input signal comprises:
  transmitting, to the network node, UE capability information indicating the second type; and
  receiving, from the network node, a second RS of the second type.

8. A method for wireless communication by a network node, comprising:
  determining a transformation configured to transform a first reference signal (RS) of a first type to an input signal of a second type, wherein signals of the second type are associated with training a first machine learning (ML) model applied by a User Equipment (UE) to estimate a parameter used in wireless communications by the UE;
  transmitting, to the UE, an indication of the transformation; and
  transmitting, to the UE, the first reference signal (RS) of the first type,
  wherein the RS of the first type comprises a first quantity of resource elements, REs, and the input signal comprises a second quantity of REs,
  wherein the transformation comprises undersampling the first reference signal to determine the input signal based on reducing the first quantity of REs to the second quantity of REs, if the first quantity of REs is larger than the second quantity of REs.

9. The method of claim 8, wherein the transformation comprises one or more of:

a linear interpolation algorithm, a Fast Fourier Transformation (FFT) interpolation algorithm, a one-dimensional or two-dimensional interpolation algorithm, a second ML model trained to impute missing input data for the first ML model, a statistical imputation algorithm based on one or more previously transmitted RSs, and oversampling the first reference signal.

10. The method of claim 8, wherein determining the transformation comprises:

receiving one or more of:

capability information from the UE; and channel state information (CSI) from a plurality of UEs; and determining the transformation based on one or more of:

the received capability information; and the received CSI.

11. The method of claim 10, wherein determining the transformation comprises:

determining a second signal configured to generate the input signal of the second type by merging the RS of the first type and the second signal, and wherein the indication comprises the second signal.

12. The method of claim 10, wherein determining the transformation further comprises:

determining, based on the received CSI, whether a change of a condition of the network node or CSI characteristics exceeds a threshold value;

determining that the transformation comprises oversampling, undersampling or an interpolation algorithm, in accordance with the threshold value being exceeded; and determining that the transformation comprises statistical imputation or imputation based on ML, in accordance with the threshold value being not exceeded.

13. The method of claim 12, wherein the condition includes one or more of:

an interference level at the UE, a resource occupancy level of the network node, a characteristic doppler spread of the CSI, and a characteristic delay spread of the CSI.

14. The method of claim 8, further comprising:

receiving, from the UE, UE capability information indicating the second type; and transmitting, to the UE, a second RS of the second type.

15. An apparatus for wireless communication by a user equipment (UE), comprising:

memory; and one or more processors coupled with the memory, the memory and the one or more processors configured to:

receive, from a network node, a reference signal (RS) of a first type;

determine, based on the reference signal, an input signal of a second type, wherein signals of the second type are associated with training a first machine learning (ML) model applied by the UE to estimate a parameter used in wireless communications by the UE; and apply the input signal of the second type to the first ML model to estimate the parameter used in wireless communications by the UE, wherein the RS of the first type comprises a first quantity of resource elements, REs, and the input signal comprises a second quantity of REs, wherein determining the input signal comprises: undersampling the reference signal to determine the input signal based on reducing the first quantity of REs to the second quantity of REs, if the first quantity of REs is larger than the second quantity of REs.

16. The apparatus of claim 15, wherein the memory and the one or more processors are configured to determine the input signal based on receiving, from the network node, an indication for determining the input signal of the second type; and determining the input signal based on the indication.

17. The apparatus of claim 16, wherein the memory and the one or more processors are further configured to:

transmit UE capability information to the network node; and wherein the indication is based on the UE capability information.

18. The apparatus of claim 15, wherein the memory and the one or more processors are configured to determine the input signal based on:

transmitting, to the network node, UE capability information indicating the second type;

receiving, from the network node, a second signal; and determining the input signal based on merging the RS and the second signal.

19. An apparatus for wireless communication by a network node, comprising:

memory; and one or more processors coupled with the memory, the memory and the one or more processors configured to:

determine a transformation configured to transform a first reference signal (RS) of a first type to an input signal of a second type, wherein signals of the second type are associated with training a first machine learning (ML) model applied by a User Equipment (UE) to estimate a parameter used in wireless communications by the UE;

transmit, to the UE, an indication of the transformation; and transmit, to the UE, the first reference signal (RS) of the first type, wherein the RS of the first type comprises a first quantity of resource elements, REs, and the input signal comprises a second quantity of REs, wherein the transformation comprises undersampling the first reference signal to determine the input signal based on reducing the first quantity of REs to the second quantity of REs, if the first quantity of REs is larger than the second quantity of REs.

20. The apparatus of claim 19, wherein the memory and the one or more processors are configured to determine the transformation based on:

receiving one or more of:

capability information from the UE; and channel state information (CSI) from a plurality of UEs; and determining the transformation based on one or more of:

the received capability information; and the received CSI.

21. The apparatus of claim 20, wherein the memory and the one or more processors are configured to determine the transformation based on:

determining a second signal configured to generate the input signal of the second type by merging the first RS of the first type and the second signal, and wherein the indication comprises the second signal.

22. The apparatus of claim 20, wherein the memory and the one or more processors are configured to determine the transformation based on:

determining, based on the received CSI, whether a change of a condition of the network node or CSI characteristics exceeds a threshold value;

determining that the transformation comprises oversampling, undersampling or an interpolation algorithm, in accordance with the threshold value being exceeded; and determining that the transformation comprises statistical imputation or imputation based on ML, in accordance with the threshold value being not exceeded.

\* \* \* \* \*